US012664513B2

(12) United States Patent
Thirunavukkarasu et al.

(10) Patent No.: US 12,664,513 B2
(45) Date of Patent: Jun. 23, 2026

(54) METHOD AND SYSTEM FOR VARIETY OPTIMIZATION IN HYPER-LOCALIZED ASSORTMENT

(71) Applicant: Tata Consultancy Services Limited, Mumbai (IN)

(72) Inventors: Jeisobers Thirunavukkarasu, Chennai (IN); Arun Rasika Karunakaran, Chennai (IN); Dhanasekaran Gopal, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 209 days.

(21) Appl. No.: 18/418,658

(22) Filed: Jan. 22, 2024

(65) Prior Publication Data

US 2024/0249241 A1    Jul. 25, 2024

(30) Foreign Application Priority Data

Jan. 20, 2023    (IN) .............................. 202321004129

(51) Int. Cl.
*G06Q 10/087*    (2023.01)
*G06F 17/00*    (2019.01)
(52) U.S. Cl.
CPC .................................. *G06Q 10/087* (2013.01)
(58) Field of Classification Search
CPC .............................. G06Q 10/087; G06F 17/00
USPC .......................................................... 705/28
See application file for complete search history.

(56) References Cited

U.S. PATENT DOCUMENTS

| | | | |
|---|---|---|---|
| 6,516,302 B1 * | 2/2003 | Deaton .............. | G06Q 30/0239 |
| | | | 705/14.38 |
| 2008/0270363 A1 * | 10/2008 | Hunt ................... | G06F 16/2462 |
| 2014/0201001 A1 * | 7/2014 | Rellas ................ | G06Q 30/0261 |
| | | | 705/26.25 |

OTHER PUBLICATIONS

Giering, "Retail Sales Prediction and Item Recommendations Using Customer Demographics at Store Level," 10(2) (2008).

(Continued)

*Primary Examiner* — Luna Champagne
(74) *Attorney, Agent, or Firm* — Finnegan, Henderson, Farabow, Garrett & Dunner, LLP

(57)    ABSTRACT

The disclosure relates generally to assortment of products in a retail scenario and more particularly to variety optimization in hyper-localized assortment. In retail scenario, due to availability of limited space in the store, retailers have limited options for displaying a category based on the attribute values of important attributes of the category. In addition, due to increased customer expectations, the attribute values are increasing each day leading to challenges in variety optimization in assortment. The state-of-art techniques address the problem of identification of key attributes for a category, however identifying optimal attribute values among the numerous attribute values specific to location of stores is still challenging. The disclosure provides methods to enable variety optimization in hyper localized assortment by identifying optimal attribute values for each attribute which are influenced mostly by location of stores by creating and applying dynamic variables in canonical analysis using hierarchical templates in an iterative way.

17 Claims, 22 Drawing Sheets

(56) References Cited

OTHER PUBLICATIONS

Hu et al., "Development of Recommendation Engines for Enhancing Sales of DIY (Do It Yourself) Stores: Vertical Approach vs. Horizontal Approach," 1(1) (2017).
Ku et al., "Consumer Preferences for the Interface of E-Commerce Product Recommendation System," (2014).

\* cited by examiner

Plurality of inputs

INPUT MODULE
202

ATTRIBUTE
HIERARCHICAL
TEMPLATE
204

SALES
PERFORMANCE
MEASURE
208

AGGREGATED
VALUE
210

LOCAL FACTOR
HIERARCHICAL
TEMPLATE
206

FIRST SET
212

SECOND SET
214

HYPER LOCALIZED ASSORTMENT
216

200 receiving a plurality of inputs associated to one or more products of a category for a plurality of geographical zip codes, wherein the plurality of inputs comprises a historical purchase data of the one or more products at a ZIP code level for a dynamic aggregation interval, wherein each one or more products is associated with a product identifier, a plurality of attributes, a plurality of attribute values associated with each attribute from the plurality of attributes, a quantity, a plurality of local factors, a plurality of local factor values associated with each local factor from the plurality of local factors and a product master data — 302 creating an attribute hierarchical template for each of the plurality of attributes using the product master data for a category, via the one or more hardware processors, wherein the attribute hierarchical template for each attribute comprises a plurality of attribute levels including a bottom attribute level, a top attribute level and a plurality of middle attribute levels — 304 creating a local factor hierarchical template for each local factor from plurality of local factors, via the one or more hardware processors, wherein the local factor hierarchical template for each local factor comprises a plurality of levels including a bottom local factor level, a top local factor level and a plurality of middle local factor levels — 306

computing a sales performance measure for each attribute value of each attribute among the plurality of attributes for the dynamic aggregation interval from the historical purchase data for each level from the plurality of attribute levels based on the attribute hierarchical template, via the one or more hardware processors, wherein the dynamic aggregation interval refers to an aggregation interval comprising one of a daily interval, a weekly interval and a monthly interval ⌐ 308 computing an aggregated value for each of the plurality of local factor value for the local factor among the plurality of local factors, via the one or more hardware processors, using the local factor hierarchical template for the local factor from the local factor data for the dynamic aggregation interval for each level from the plurality of local factor levels ⌐ 310 identifying a first set of optimal attribute values for each attribute, a first set of optimal local factor values for each local factor, an ideal aggregation interval within the dynamic aggregation intervals, via the one or more hardware processors, wherein:
(a)the first set of optimal attribute values and a corresponding optimal attribute level are recognized from a level among the plurality of levels of the attribute hierarchical template based on a canonical analysis technique; and
(b)the first set of local factor values and a corresponding optimal local factor level are recognized from a local factor level among the plurality of levels of the local factor hierarchical template based on the canonical analysis technique ⌐ 312

 300          FIG. 3B

identifying a second set of optimal attribute values and a second set of optimal local factor values, via the one or more hardware processors, by performing the canonical analysis technique on the identified optimal attribute level in the attribute hierarchical template and the identified optimal local factor level in the local factor hierarchical template    314 performing a hyper localized assortment of a category based on the identified first set of optimal attribute values of each attribute and the second set of optimal attribute values of each attribute and performing clustering of the geographical zip codes, via the one or more hardware processors, based on independent canonical variates derived during the canonical analysis technique using the identified first set of optimal local factor values of each local factor and the second set of optimal local factor values of each local factor    316

Attribute Hierarchical Template – Attribute 'Size'

Local Factor Hierarchical Template – Local Factor 'Population'

Local Factor Hierarchical Template – Local Factor 'Population'

Local Factor Hierarchical Template – Local Factor 'Temperature'

Local Factor Hierarchical Template – Local Factor 'Temperature'

Dynamic Variable Creation – Attribute 'Size' – Day Level

First iteration

| Attribute (Att) | Att_1 | | Number of units sold - Size value | | Att_1 | | Att | |
|---|---|---|---|---|---|---|---|---|
| Dynamic Variable (DV) | Att_DV_1 | | Small_0 | Large_0 | Att_DV_1 | | Att_DV_1 | |
| Sample_1_Day 1 | | | 30 | 5 | | | | |
| Sample_2_Day 1 | | | | | | | | |

Third iteration

| Attribute (Att) | Att_1 | | Number of units sold - Size value | | | | | | Att_1 | | Att | |
|---|---|---|---|---|---|---|---|---|---|---|---|---|
| Dynamic Variable (DV) | Att_DV_1 | | Very small_0 | Small | Medium_30 | High medium | Large | Extra large_0 | Att_DV_1 | | Att_DV_1 | |
| Sample_1_Day 1 | | | 30 | 15 | 30 | 5 | 5 | | | | | |
| Sample_2_Day 1 | | | | | | | | | | | | |

Fourth iteration

| Attribute (Att) | Att_1 | | Number of units sold - Size value | | | | | | | | Att_1 | |
|---|---|---|---|---|---|---|---|---|---|---|---|---|
| Dynamic Variable (DV) | Att_DV_1 | | Very small_1 | Very small_2 | Small | Low medium | Medium | High medium | Large | Extra large | Double extra large | Att_DV_1 |
| Sample_1_Day 1 | | | 20 | 25 | 12 | 15 | 10 | 5 | 5 | 5 | 5 | |
| Sample_2_Day 1 | | | | | | | | | | | | |

FIG. 8A

Dynamic Variable Creation – Attribute 'Size' – Week level

FIG. 8B

Dynamic Variable Creation – Local Factor 'Population'

FIG. 8C

Dynamic Variable Creation – Local Factor 'Income'

FIG. 8D

Dynamic Variable Creation – Local Factor 'Temperature' – Day level

FIG. 8E

Dynamic Variable Creation – Local Factor 'Temperature' – Week level

FIG. 8F iteratively computing a wilks lambda for each iteration by performing the canonical analysis technique between (i) each of the plurality of levels of the attribute hierarchical template with the sales performance measure of each of the attribute values of the plurality of attributes for the dynamic aggregation interval and (ii) each of the plurality levels of the local factor hierarchical template with the aggregated value of each local factor from the plurality of local factors for the dynamic aggregation interval          902 identifying an optimal attribute level in the attribute hierarchical template with an ideal aggregation interval and an optimal local factor level in the local factor hierarchical template with the ideal aggregation interval based on the wilks lambda among the wilks lambda values computed, wherein the ideal aggregation interval is identified within the dynamic aggregation intervals based on the wilks lambda values          904 recognizing the first set of optimal attribute values for each plurality of attribute from the identified optimal attribute level of the attribute hierarchical template and recognizing the first set of local factor values for each local factor from the identified optimal local factor level of the local factor hierarchical template          906

 900

FIG. 9 iteratively performing the canonical analysis technique on the identified optimal attribute level to obtain a wilks lambda for each iteration, wherein the canonical analysis technique is performed for each iteration based on the attribute values of the attribute corresponding to the identified optimal attribute level of the attribute hierarchical template by changing one attribute values at a time for the iteration while keeping the other attribute values at the identified optimal attribute level and retaining the local factor values of the local factor at the identified optimal local factor level    1002 identifying the second set of optimal attribute values using the attribute values of the attribute in the identified optimal attribute level resulting in an improvement in wilks lambda obtained for each iteration    1004

Figure 11:
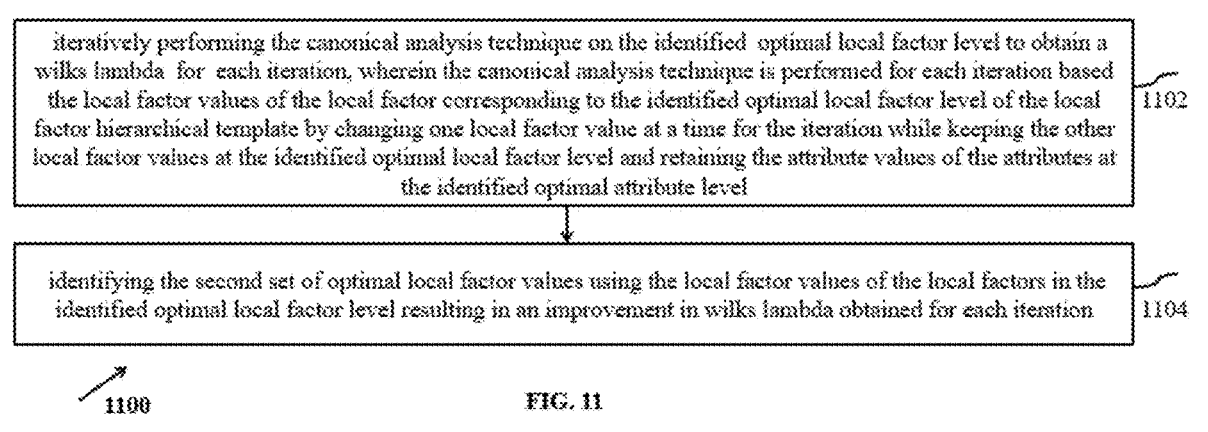

1000                FIG. 10 iteratively performing the canonical analysis technique on the identified optimal local factor level to obtain a wilks lambda for each iteration, wherein the canonical analysis technique is performed for each iteration based the local factor values of the local factor corresponding to the identified optimal local factor level of the local factor hierarchical template by changing one local factor value at a time for the iteration while keeping the other local factor values at the identified optimal local factor level and retaining the attribute values of the attributes at the identified optimal attribute level
1102 identifying the second set of optimal local factor values using the local factor values of the local factors in the identified optimal local factor level resulting in an improvement in wilks lambda obtained for each iteration
1104

METHOD AND SYSTEM FOR VARIETY OPTIMIZATION IN HYPER-LOCALIZED ASSORTMENT

PRIORITY CLAIM

This U.S. patent application claims priority under 35 U.S.C. § 119 to: Indian Patent Application No. 202321004129, filed on Jan. 20, 2023. The entire contents of the aforementioned application are incorporated herein by reference.

TECHNICAL FIELD

The disclosure herein generally relates to assortment of products in a retail scenario and, more particularly, to variety optimization in hyper-localized assortment.

BACKGROUND

Over the years the retail industry has transformed significantly and has been focusing on offering products that are most relevant for their customers. Irrespective of the type of the products the retail industry is focusing on engaging and providing, personalized customer experiences that can ultimately increase the revenue and profit. Hence to provide for personalized customer experiences and relevant products, the retail industry is analyzing all the way down to the region and city level, looking at how shoppers are searching and buying. Hyper localization with respect to attribute values may be defined as offering of optimal attribute values specific to location of stores.

In a retail scenario for hyper-localization, the major challenge faced by numerous retailers is with deciding "a number" of varieties of attribute values to be kept in assortment, this is due to the numerous attributes associated with category of products and dependency on location of store. In retail scenario—'variety' with respect to attributes is being used to refer to a 'number of variants of attribute values' within a category. State-of-art techniques exist for identification of key attributes, however identifying optimal attribute values among the numerous attribute values for each attribute is a big hurdle in efficient determination of hyper-localization. Further, in case of stores, the retailers have limited space and while determining the attribute values during hyper-localization, the limited space must also be considered.

SUMMARY

Embodiments of the present disclosure present technological improvements as solutions to one or more of the above-mentioned technical problems recognized by the inventors in conventional systems. For example, in one embodiment, a method for variety optimization in hyper-localized assortment is provided.

The system includes a memory storing instructions, one or more communication interfaces, and one or more hardware processors coupled to the memory via the one or more communication interfaces, wherein the one or more hardware processors are configured by the instructions to receive a plurality of inputs associated to one or more products of a category for a plurality of geographical ZIP codes, wherein the plurality of inputs comprises a historical purchase data of the one or more products at a ZIP code level for a dynamic aggregation interval, wherein each one or more products is associated with a product identifier, a plurality of attributes, a plurality of attribute values associated with each attribute from the plurality of attributes, a quantity, a plurality of local factors, a plurality of local factor values associated with each local factor from the plurality of local factors and a product master data. The system is further configured for creating an attribute hierarchical template for each of the attribute using the product master data for a category, wherein the attribute hierarchical template for each attribute comprises a plurality of attribute levels including a bottom attribute level, a top attribute level and a plurality of middle attribute levels. The system is further configured for creating a local factor hierarchical template for each local factor from plurality of local factors, wherein the local factor hierarchical template for each local factor comprises a plurality of levels including a bottom local factor level, a top local factor level and a plurality of middle local factor levels. The system is further configured for computing a sales performance measure for each attribute value of each attribute among the plurality of attributes for the dynamic aggregation interval from the historical purchase data for each level from the plurality of attribute levels based on the attribute hierarchical template, wherein the dynamic aggregation interval refers to an aggregation interval comprising one of a daily interval, a weekly interval, and a monthly interval. The system is further configured for computing an aggregated value for each local factor value for the local factor among the plurality of local factors using the local factor hierarchical template for the local factor from the local factor data for the dynamic aggregation interval for each level from the plurality of local factor levels. The system is further configured for identifying a first set of optimal attribute values for each attribute, a first set of optimal local factor values for each local factor, an ideal aggregation interval within the dynamic aggregation intervals, wherein: (a) the first set of optimal attribute values and a corresponding optimal attribute level are recognized from a level among the plurality of levels of the attribute hierarchical template based on a canonical analysis technique; and (b) the first set of local factor values and a corresponding optimal local factor level are recognized from a local factor level among the plurality of levels of the local factor hierarchical template based on the canonical analysis technique. The system is further configured for identifying a second set of optimal attribute values and a second set of optimal local factor values by performing the canonical analysis technique on the identified optimal attribute level in the attribute hierarchical template and the identified optimal local factor level in the local factor hierarchical template. The system is further configured for performing a hyper localized assortment of a category based on the identified first set of optimal attribute values of each attribute and the second set of optimal attribute values of each attribute and performing clustering of the geographical ZIP codes based on independent canonical variates derived during the canonical analysis technique using the identified first set of optimal local factor values of each local factor and the second set of optimal local factor values of each local factor.

In another aspect, a method for variety optimization in hyper-localized assortment is provided. The method includes receiving a plurality of inputs associated to one or more products of a category for a plurality of geographical ZIP codes, wherein the plurality of inputs comprises a historical purchase data of the one or more products at a ZIP code level for a dynamic aggregation interval, wherein each one or more products is associated with a product identifier, a plurality of attributes, a plurality of attribute values associated with each attribute from the plurality of attributes, a quantity, a plurality of local factors, a plurality of local factor values associated with each local factor from the plurality of local factors and a product master data. The method further includes creating an attribute hierarchical template for each of the attribute using the product master data for a category, wherein the attribute hierarchical template for each attribute comprises a plurality of attribute levels including a bottom attribute level, a top attribute level and a plurality of middle attribute levels. The method further includes creating a local factor hierarchical template for each local factor from plurality of local factors, wherein the local factor hierarchical template for each local factor comprises a plurality of levels including a bottom local factor level, a top local factor level and a plurality of middle local factor levels. The method further includes computing a sales performance measure for each attribute value of each attribute among the plurality of attributes for the dynamic aggregation interval from the historical purchase data for each level from the plurality of attribute levels based on the attribute hierarchical template, wherein the dynamic aggregation interval refers to an aggregation interval comprising one of a daily interval, a weekly interval, and a monthly interval. The method further includes computing an aggregated value for each local factor value for the local factor among the plurality of local factors using the local factor hierarchical template for the local factor from the local factor data for the dynamic aggregation interval for each level from the plurality of local factor levels. The method further includes identifying a first set of optimal attribute values for each attribute, a first set of optimal local factor values for each local factor, an ideal aggregation interval within the dynamic aggregation intervals, wherein: (a) the first set of optimal attribute values and a corresponding optimal attribute level are recognized from a level among the plurality of levels of the attribute hierarchical template based on a canonical analysis technique; and (b) the first set of local factor values and a corresponding optimal local factor level are recognized from a local factor level among the plurality of levels of the local factor hierarchical template based on the canonical analysis technique. The method further includes identifying a second set of optimal attribute values and a second set of optimal local factor values by performing the canonical analysis technique on the identified optimal attribute level in the attribute hierarchical template and the identified optimal local factor level in the local factor hierarchical template. The method further includes performing a hyper localized assortment of a category based on the identified first set of optimal attribute values of each attribute and the second set of optimal attribute values of each attribute and performing clustering of the geographical ZIP codes based on independent canonical variates derived during the canonical analysis technique using the identified first set of optimal local factor values of each local factor and the second set of optimal local factor values of each local factor.

In yet another aspect, a non-transitory computer readable medium for variety optimization in hyper-localized assortment is provided. The method includes receiving a plurality of inputs associated to one or more products of a category for a plurality of geographical ZIP codes, wherein the plurality of inputs comprises a historical purchase data of the one or more products at a ZIP code level for a dynamic aggregation interval, wherein each one or more products is associated with a product identifier, a plurality of attributes, a plurality of attribute values associated with each attribute from the plurality of attributes, a quantity, a plurality of local factors, a plurality of local factor values associated with each local factor from the plurality of local factors and a product master data. The method further includes creating an attribute hierarchical template for each of the attribute using the product master data for a category, wherein the attribute hierarchical template for each attribute comprises a plurality of attribute levels including a bottom attribute level, a top attribute level and a plurality of middle attribute levels. The method further includes creating a local factor hierarchical template for each local factor from plurality of local factors, wherein the local factor hierarchical template for each local factor comprises a plurality of levels including a bottom local factor level, a top local factor level and a plurality of middle local factor levels. The method further includes computing a sales performance measure for each attribute value of each attribute among the plurality of attributes for the dynamic aggregation interval from the historical purchase data for each level from the plurality of attribute levels based on the attribute hierarchical template, wherein the dynamic aggregation interval refers to an aggregation interval comprising one of a daily interval, a weekly interval, and a monthly interval. The method further includes computing an aggregated value for each local factor value for the local factor among the plurality of local factors using the local factor hierarchical template for the local factor from the local factor data for the dynamic aggregation interval for each level from the plurality of local factor levels. The method further includes identifying a first set of optimal attribute values for each attribute, a first set of optimal local factor values for each local factor, an ideal aggregation interval within the dynamic aggregation intervals, wherein: (a) the first set of optimal attribute values and a corresponding optimal attribute level are recognized from a level among the plurality of levels of the attribute hierarchical template based on a canonical analysis technique; and (b) the first set of local factor values and a corresponding optimal local factor level are recognized from a local factor level among the plurality of levels of the local factor hierarchical template based on the canonical analysis technique. The method further includes identifying a second set of optimal attribute values and a second set of optimal local factor values by performing the canonical analysis technique on the identified optimal attribute level in the attribute hierarchical template and the identified optimal local factor level in the local factor hierarchical template. The method further includes performing a hyper localized assortment of a category based on the identified first set of optimal attribute values of each attribute and the second set of optimal attribute values of each attribute and performing clustering of the geographical ZIP codes based on independent canonical variates derived during the canonical analysis technique using the identified first set of optimal local factor values of each local factor and the second set of optimal local factor values of each local factor.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

US 12,664,513 B2

5

Figure 2:
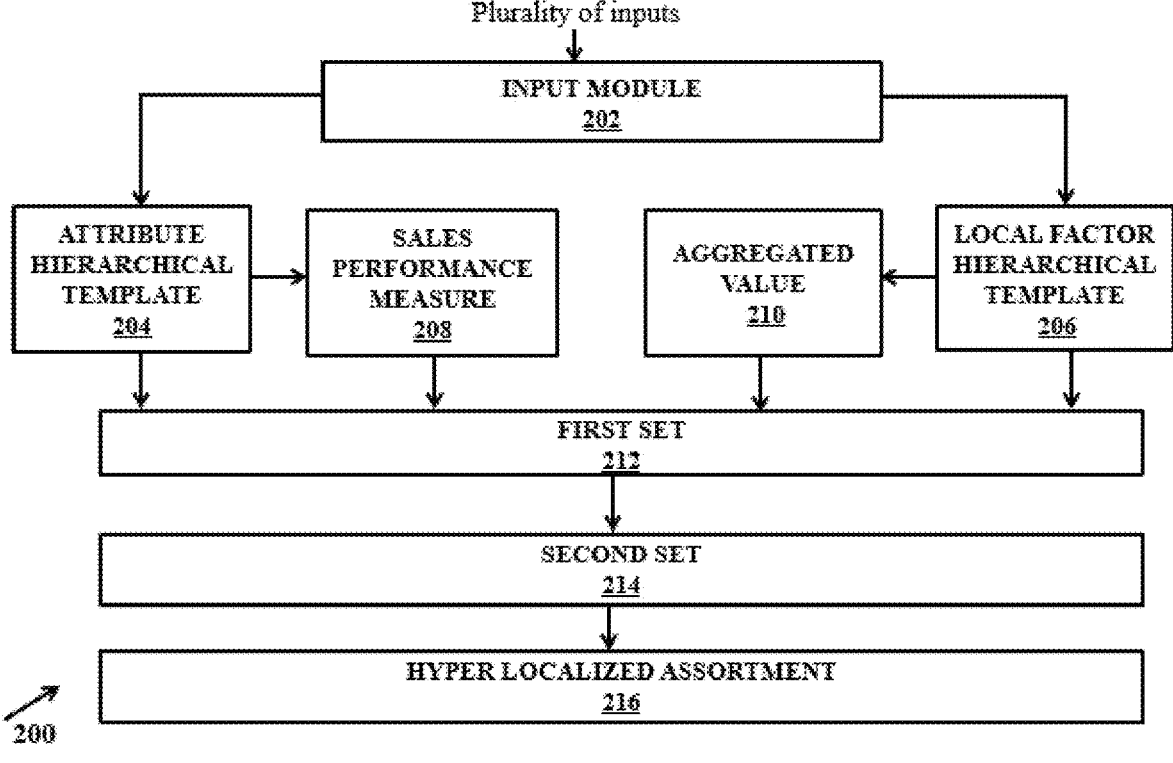

FIG. 2 is a functional block diagram for variety optimization in hyper-localized assortment according to some embodiments of the present disclosure.

Figure 3A:
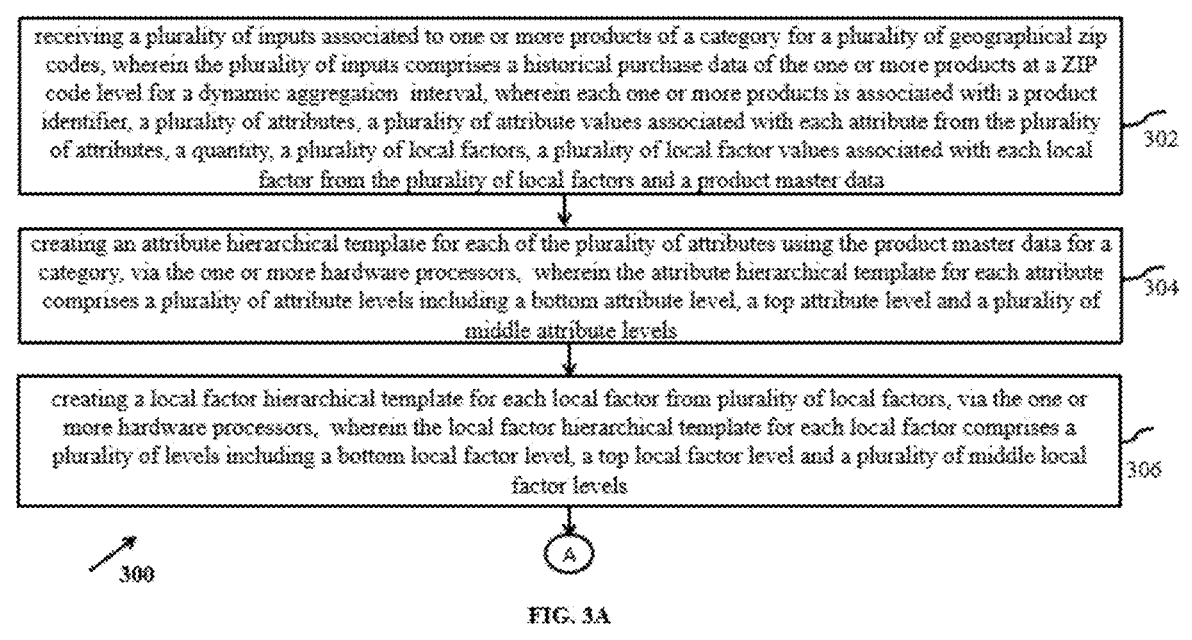

FIG. 3A, FIG. 3B and FIG. 3C is a flow diagram illustrating a method for variety optimization in hyper-localized assortment in accordance with some embodiments of the present disclosure.

Figure 4A:
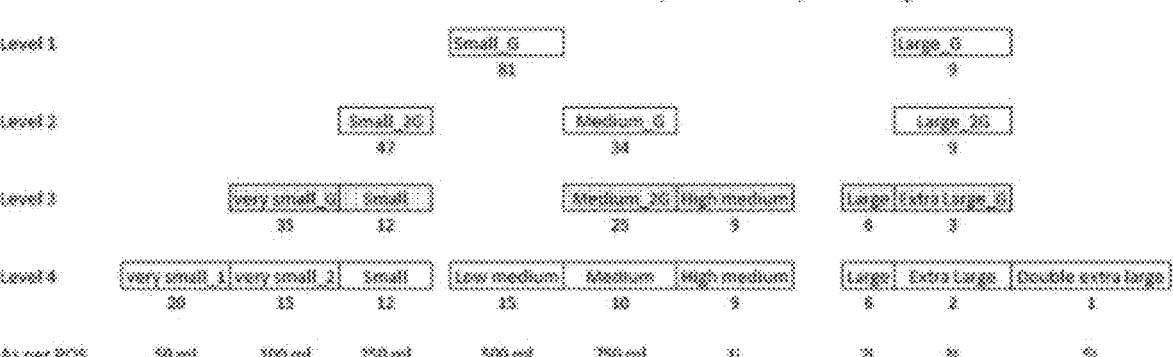
Figure 4B:
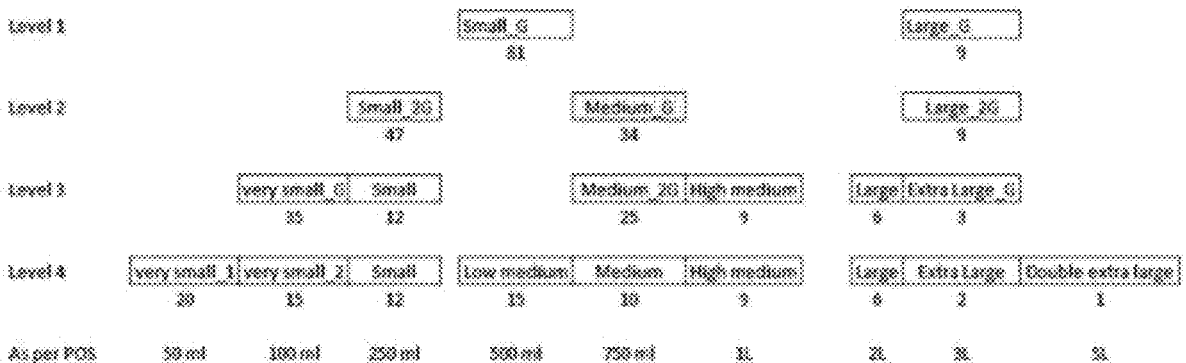

FIG. 4A and FIG. 4B illustrates the creation of an attribute hierarchical template for an example scenario of an attribute 'size' of a category 'yogurt', a first set of optimal attribute values and a second set of optimal attribute values in accordance with some embodiments of the present disclosure.

Figure 5A:
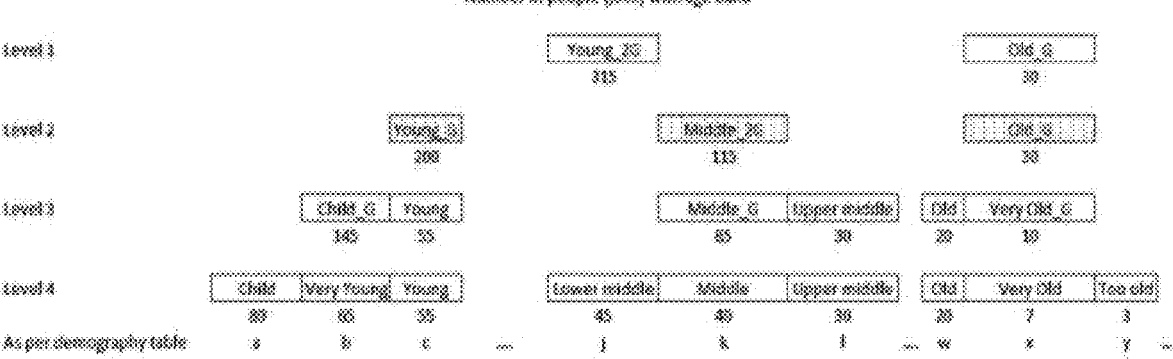
Figure 5B:
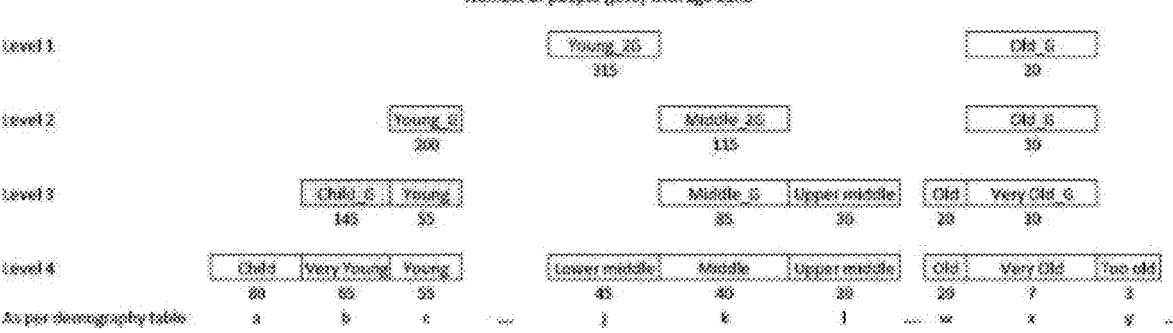

FIG. 5A and FIG. 5B illustrates the creation of the local factor hierarchical template for an example scenario of the local factor 'population', the first set of optimal local factor values and the second set of optimal local factor values in accordance with some embodiments of the present disclosure.

Figure 6A:
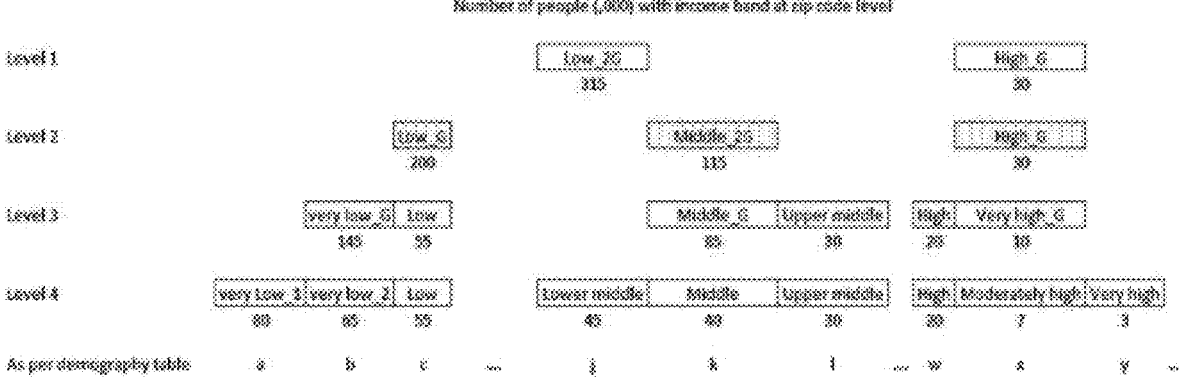
Figure 6B:
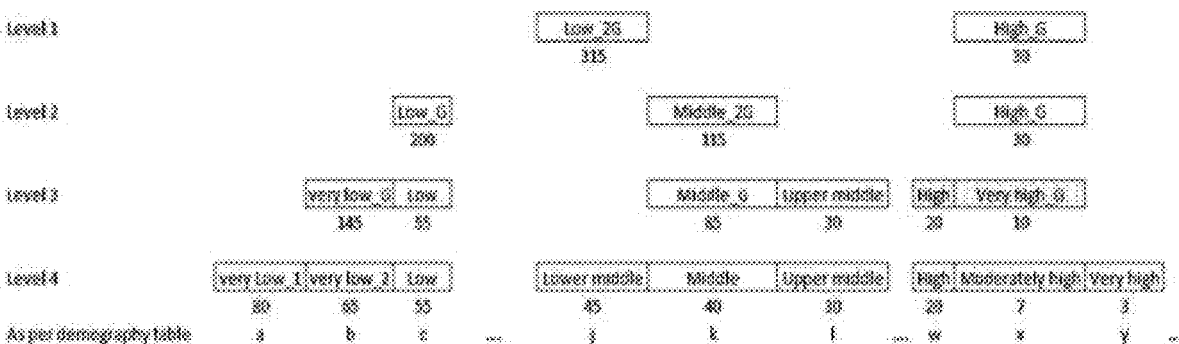

FIG. 6A and FIG. 6B illustrates the creation of the local factor hierarchical template for an example scenario of a local factor 'income', the first set of optimal local factor values and the second set of optimal local factor values in accordance with some embodiments of the present disclosure.

Figure 7A:
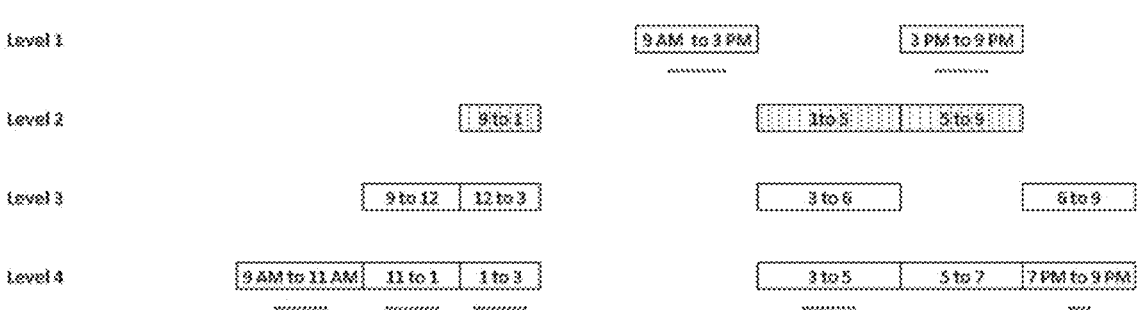
Figure 7B:
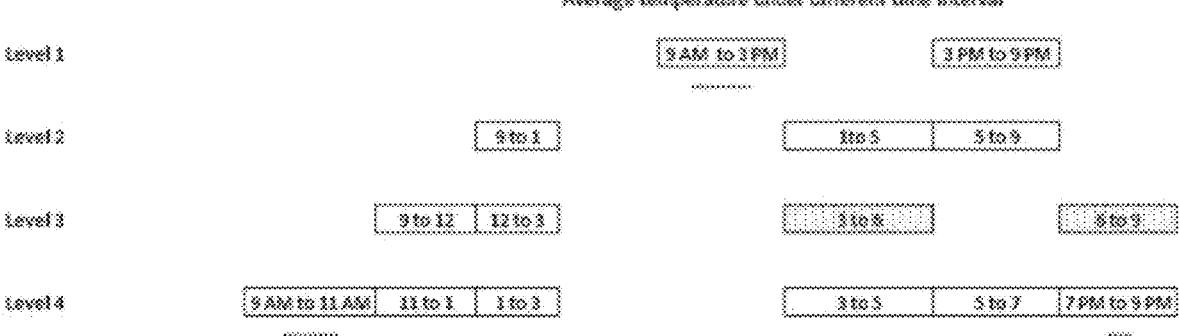

FIG. 7A and FIG. 7B illustrates the creation of the hierarchical template for an example scenario of a local factor 'temperature', the first set of optimal local factor values and the second set of optimal local factor values in accordance with some embodiments of the present disclosure.

FIG. 8A through FIG. 8F illustrate formation of dynamic variables for a plurality of attributes and a plurality of local factors individually in accordance with some embodiments of the present disclosure.

FIG. 9 is a flow diagram illustrating a method for identifying the first set of optimal attribute values and the first set of optimal local factor values in accordance with some embodiments of the present disclosure.

FIG. 10 is a flow diagram illustrating a method for identifying the second set of optimal attribute values for each attribute in accordance with some embodiments of the present disclosure.

FIG. 11 is a flow diagram illustrating a method for the second set of optimal local factor for each local factor in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The retail industry has transformed significantly and has been focusing on offering products that are most relevant for their customers. Irrespective of the type of the products the retail industry is focusing on engaging and providing, personalized customer experiences that can ultimately increase the revenue and profit. Hence to provide for personalized customer experiences and relevant products, the retail industry is analyzing all the way down to the region and city level, looking at how shoppers are searching and buying. The hyper localized assortment of a category of product refers to offering of attribute values of the category based on the location of a store, wherein the ZIP code indicates the location of store.

Referring now to the drawings, and more particularly to FIG. 1 through FIG. 11, where similar reference characters denote corresponding features consistently throughout the figures, there are shown preferred embodiments and these embodiments are described in the context of the following exemplary system and/or method.

In retail scenario—'variety' with respect to attributes is used to refer to a 'number of variants of attribute values' within a category. State-of-art techniques address identification of key attributes, however identifying optimal attribute values among the numerous attribute values for each attribute is a big hurdle in efficient determination of hyperlocalization. Optimal values for each attribute may address location specific customer preferences and customer differential preferences and corresponding attribute values is termed as optimal attribute values and identifying those optimal attribute values is termed as variety optimization. Here, variety' with respect to attributes is being used to refer to a 'number of optimal variants of attribute values' within a category. Hyper localization with respect to attribute values may be defined as offering of optimal attribute values specific to location of stores.

Figure 1:
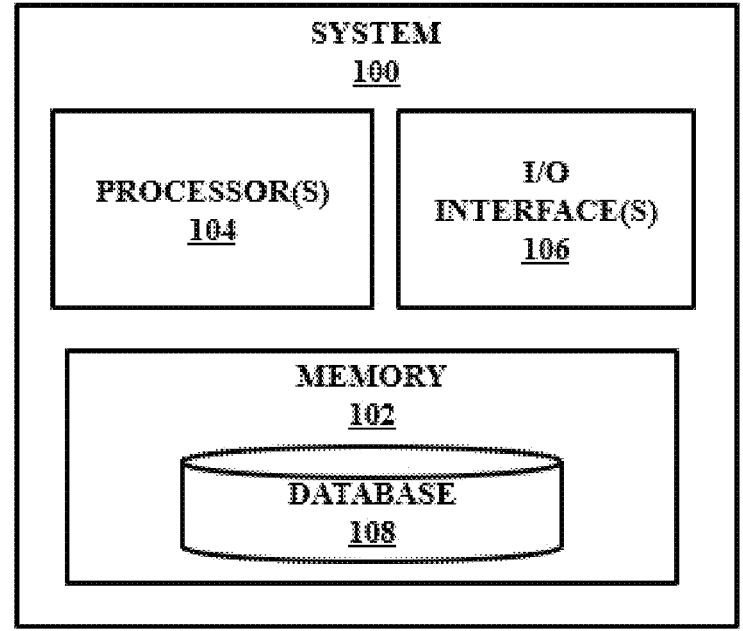
FIG. 1 illustrates an exemplary system for variety optimization in hyper-localized assortment according to some embodiments of the present disclosure.

FIG. 1 is an exemplary block diagram of a system 100 for variety optimization in hyper-localized assortment in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or nonvolatile memory, such as read only memory (ROM), erasable programmable ROM, flash memories, hard disks, optical disks, and magnetic tapes.

Further, the memory 102 may include a database 108 configured to include information regarding variety optimization in hyper-localized assortment. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Functions of the components of system 100 are explained in conjunction with functional overview of the system 100 in FIG. 2 and flow diagram of FIG. 3A and FIG. 3B for variety optimization in hyper-localized assortment.

FIG. 2 is an example functional block diagram of the various modules of the system of FIG. 1, in accordance with some embodiments of the present disclosure. As depicted in the architecture, the FIG. 2 illustrates the functions of the modules of the system 100 that includes for variety optimization in hyper-localized assortment.

As depicted in FIG. 2, the functional representation of the system 100 is configured for variety optimization in hyper-localized assortment.

The system 200 comprises an input module 202 configured for receiving a plurality of inputs associated to one or more products of a category for a plurality of geographical ZIP codes. The system 200 further comprises an attribute hierarchical template 204 configured for creating an attribute hierarchical template for each of the attribute using the product master data for a category. The system 200 further comprises a local factor hierarchical template 206 configured for creating a local factor hierarchical template for each local factor from plurality of local factors. The system 200 further comprises a sales performance measure 208 configured for computing a sales performance measure for each attribute value of each attribute among the plurality of attributes for a dynamic aggregation interval from the historical purchase data for each level from the plurality of attribute levels as per the attribute hierarchical template. The system 200 further comprises an aggregated value 210 configured for computing an aggregated value for each local factor value for the local factor among the plurality of local factors using the local factor hierarchical template for the local factor from the local factor data for the dynamic aggregation interval for each level from the plurality of local factor levels. The system 200 further comprises a first set 212 configured for identifying a first set of optimal attribute values for each attribute, a first set of optimal local factor values for each local factor, an ideal aggregation interval within the dynamic aggregation intervals. The system 200 further comprises a second set 214 configured for identifying a second set of optimal attribute values and a second set of optimal local factor values by performing the canonical analysis technique on the identified optimal attribute level in the attribute hierarchical template and the identified optimal local factor level in the local factor hierarchical template. The system 200 further comprises hyper localized assortment 214 configured for performing a hyper localized assortment of a category based on the identified first set of optimal attribute values of each attribute and the second set of optimal attribute values of each attribute and performing clustering of the geographical ZIP codes based on the identified first set of optimal local factor values of each local factor and the second set of optimal local factor values of each local factor.

The various modules of the system 200 in FIG. 2 are configured for variety optimization in hyper-localized assortment and implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with the system 100 stored in the memory 102 and further explained in conjunction with flow diagram of FIGS. 3A, 3B and 3C. The FIGS. 3A, 3B and 3C with reference to FIG. 1, is an exemplary flow diagram illustrating a method 300 for variety optimization in hyper-localized assortment using the system 100 of FIG. 1 according to an embodiment of the present disclosure.

The steps of the method of the present disclosure will now be explained with reference to the components of the system 100 of FIG. 1 for variety optimization in hyper-localized assortment and the modules 202-216 as depicted in FIG. 2 and the flow diagrams as depicted in FIGS. 3A, 3B and 3C. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300, a plurality of inputs is received at the input module 202, wherein the plurality of inputs is associated to one or more products of a category for a plurality of geographical ZIP codes. The plurality of inputs comprises a historical purchase data of the one or more products at a ZIP code level for a specified aggregation interval. Each one or more products is associated with a product identifier, a plurality of attributes, a plurality of attribute values associated with each attribute from the plurality of attributes, a quantity, a plurality of local factors, a plurality of local factor values associated with each local factor from the plurality of local factors and a product master data.

The plurality of local factor data comprises a demographic data capturing information about each ZIP code covering a trade area. The local factors is defined as factors that influence sales of the items sold by a retailer and are captured by third party vendors such as market research companies, weather stations and the like and they are purchased or collected by the retailers for their retail strategies. The local factors are captured at a ZIP code level and few examples for local factors are demographic variables such as total population, income, ethnicity, household income, etc and weather parameters such as precipitation, humidity, temperature, pressure, cloudiness, and wind. The population is captured at more granular level by market research companies. Few examples are age band wise total population, age band wise male population, age band wise female population, wherein age band refers to population having age range of 0 to 10, 11 to 20, 21 to 30, 31 to 40, . . . 91 to 100. Thus 10 distinct age bands are used to differentiate the population with overall level and also combined with factors such as gender, income, and ethnicity. In an example, total population with age band of 0 to 10 is captured with gender and ethnicity such as total male population with age band of 0 to 10, total female population with age band of 0 to 10 and total hispanic population with age band of 0 to 10 and the like. The weather is captured by weather stations at hourly interval. The local factor may be termed in relative measure as more granular or less granular based on the number of distinct values captured in the local factor.

The merits and demerits of granular information of the local factors—Local factors are used by retailers to understand their influence on the sales of the items sold by them. When the local factors are captured at more granular level, identification of their influence on the sales of the product becomes challenging. For example, among the population with gender and age split up, male population with age band of 71 to 80, male population with age band of 81 to 90, and male population of 91 to 100 are captured individually. The three split up provides information about the male population with very old age group and here, the differential influence on sales of products may become meaningless. In other words, if they are combined as single group such as male population with age band of 71 to 100, it may become a better measure to understand the influence of very old people with age band of 71 to 100 on product sales. However, it is not advisable to create a single group such as male population with age band of 41 to 100, as it may lead to loss of differential influence on product sales. In another instance, weather parameters are captured at hourly intervals. Hence it is necessary to convert them into ideal time interval which may be one among the two-hours interval, three-hours interval, four hours interval and six hours interval and the ideal time interval needs to be decided by considering their influence on the sales of the product and also fluctuations in the weather parameters. In another example, income is measured as 'the number of people with range of household income in dollar', and the distinct ranges are around 10. Few examples for the ranges are household income less than 10 k, household income 10 k to 14999, household income 50 k to 54999, household income 150 k to 174999, household income greater than 175 k and the like. When the income is captured at 10 distinct ranges, identification of its influence on the sales of the product becomes challenging due to the similar reason cited for population split based on age and gender. The influence of local factor at different granular level also varies based on the category. For example, yogurt category may behave differently as compared to groceries and electronics categories with respect to their influence on different granular level of local factors such as demographic and weather parameters. Thus, identification of an optimal granular level for each local factor requires consideration of mechanism of how different granular information influence the sales of products in retail and an optimal level needs to be identified to explore the influence of local factors on sales of products for each category, more particularly, sales of attribute values for each category, wherein the product is a bundle of attributes. Most of the time, customers do not buy products, they buy a bundle of attribute values. Hence, it is vital to understand the influence of attribute values important to customers.

A category refers to a group of products or items having similar buying preferences or having attribute values that are alternative to each other. Example for category are yogurt, ice cream, mobile, women's tops, women's suits, men's shirts, and men's suits, etc. Each of the one or more attributes has a predefined attribute value. In an example scenario, wherein a category of "yogurt" comprises attributes such as brand, size, flavor, packaging, etc. In another example scenario, a category of "women's top" comprises attributes such as brand, apparel size, color and design pattern, etc. Further, each attribute has a plurality of predefined attribute values such as blue, green and red for color and small, medium, large for size of apparels, Variety' with respect to attributes is being used to refer to a 'number of variants of attribute values' within a category. In an instance, size of an item in liquid format may have many distinct values such as 10 ml sachet to 5 liters canes and nature of having more distinct values may be termed as granularity of attribute. The attribute may be termed in relative measure as more granular or less granular based on the number of distinct attribute values owned by the attribute. Few attributes may have many distinct attribute values which may reach to 100 in few instances. In Yogurt category, the number of distinct flavors may reach around 100 or more and could be termed as more granular.

The merits and demerits of granular information of attribute values—customer preferences vary depending on the availability of attribute values across attribute. In an instance, in case of yogurt category, a customer may have lesser differential preferences for 50 ml, 100 ml and in this case the two may act as single. However, the preference may vary between 250 ml and 500 ml. Same way, a customer may not have any differential preferences for 500 ml, 750 ml and 1 L and the preference may vary between 1 L and 2 L Further, customer preferences vary depending on location of the stores and weather conditions. In an instance, for the location with high income group, 2 L and 3 L may have similar preferences and for the location with low-income group, 2 L and 3 L may have different preferences. Weather condition and its fluctuations in a location may play a major role in customer preferences and customer differential preferences. In an instance, a customer may prefer larger sizes in extreme or unusual weather conditions with the intention of storing for longer usage and they may prefer smaller sizes or required sizes during normal weather conditions. During extreme weather conditions, a customer may not have any differential preferences for 50 ml, 100 ml, 250 ml and 500 ml and customer may prefer for larger sizes among the available choices. During normal weather conditions, customer differential preferences may increase. Customer differential preferences vary depending on the weather fluctuations. If the weather fluctuations are higher, customer may have lesser differential preferences. If the weather fluctuations are lower, customer may have higher differential preferences. In general, the local factors may influence customer differential preferences. Optimal values for each attribute may address location specific customer preferences and customer differential preferences and corresponding attribute values is termed as optimal attribute values and identifying those optimal attribute values is termed as variety optimization. Here, variety' with respect to attributes is being used to refer to a 'number of optimal variants of attribute values' within a category. Hyper localization with respect to attribute values may be defined as offering of optimal attribute values specific to location of stores.

At step 304 of the method 300, an attribute hierarchical template is created in the attribute hierarchical template 204. The attribute hierarchical template is created for each of the attribute using the product master data for a category. The attribute hierarchical template for each attribute comprises a plurality of attribute levels including a bottom attribute level, a top attribute level and a plurality of middle attribute levels.

The attribute hierarchical template comprises a plurality of attribute levels in which the bottom attribute level comprises a lowest level of attribute values. The top attribute level comprises a highest level of the attribute values. The plurality of middle attribute level comprises an intermediate level of the attribute value.

In an example scenario, considering "yogurt" as the category and size as the attribute, nine distinct attribute values starting from 50 ml to 5 L as displayed in the level 4 as shown in FIG. 4A. In an instance, the attribute values are grouped from bottom to top in a hierarchical way, which is a onetime activity carried out for each attribute individually based on domain expertise.

At step 306 of the method 300, a local factor hierarchical template is created in the local factor hierarchical template 206. The local factor hierarchical template is created for each local factor from plurality of local factors. The local factor hierarchical template for each local factor comprises a plurality of levels including a bottom local factor level, a top local factor level and a plurality of middle local factor levels.

The local factor hierarchical template comprises a plurality of levels in which the bottom local factor level comprises a lowest level of local factor value. The top local factor level comprises a highest level of the local factor value. The plurality of middle local factor level comprises an intermediate local factor level of the local factor values. In an example scenario, three sample local factor hierarchical templates for local factors namely (i) number of people (,000) with age band, (ii) average temperature with time interval and (iii) number of people (,000) with income band at ZIP code level are provided for better understanding. The templates is formed by considering influence of local factor values on the attribute values of a category. In an example, the template for 'number of people (000) with age band' as per FIG. 5A, shows population with age band of old (61 to 70), very old (71 to 80) and too old (81 and above) are captured individually. The three splits up provide information about the population with old age group and here the differential influence on sales of products may become less meaningful. In other words, if they are combined as single group such as male population with age band of old_G (61 and above), it may become a better measure to understand the influence of very old people on product sales. The FIG. 6A illustrates local factor with 'number of people (,000) with income band at ZIP code level' and FIG. 7A illustrates another local factor namely 'average temperature with time interval'. For understanding purpose, the average temperature at different hourly intervals is considered for explanation. As illustrated in the local factor hierarchical template for temperature (FIG. 7A), the columns for average temperature have split up within a day such as hourly split up, 3 hour split up and 6 hours split up and the like. In certain locations, weather fluctuations may be minimal. If weather fluctuations within a day are higher, weather conditions need to be considered at shorter intervals such as hourly basis to relate its effect on customer preferences. If weather fluctuations within a day are lower, weather conditions need to be considered at lengthier intervals such as 6 hours interval or 3 hours interval. In general, It is expected that the intermediate levels more particularly the level around middle of hierarchical templates of attributes and the level around middle of hierarchical templates of local factors may provide hyper localization and this logic enables to identify optimal attribute values and local factor values which is explained in later section.

At step 308 of the method 300, a sales performance measure is computed at the sales performance measure 208.

The ZIP code in which a store is located is identified and sales happened for a category in the store is considered as the sales for the ZIP code. The same logic is applied to find sales for each ZIP code. Local factors are captured for each ZIP code by market research companies. Thus, sales and local factors are received for each ZIP code. Sales of a store is stored in the "Point Of Sales" (POS) system of the store. In retail, product may be looked as bundle of attributes. Most of the time customers do not buy products, they buy a bundle of attribute values. Hence, it is vital to understand the influence of attribute values important to customers so that offering of attribute values specific to location of the stores can be achieved. In this disclosure sales of attribute values of a category due to influence of local factor values is described in detail. Sales of an attribute value of a category for a time interval for a ZIP code is calculated by considering all the products having the attribute value within the category for the time interval. In an example, sales for 100 ml yogurt for a ZIP code for a time interval is calculated by considering all the items having 100 ml irrespective of their flavor, brand etc., for the ZIP code for the time interval. The sales performance measure of each attribute value may be measured in different ways such as total sales units, average sales units per week, and the like. The sales performance measure is computed for each attribute value of each attribute among the plurality of attributes for a dynamic aggregation interval. The sales performance measure is computed from the historical purchase data for each level from the plurality of attribute levels as per the attribute hierarchical template In an example scenario, as illustrated in the FIG. 4A, POS has sales information at the lowest level and sales computation is done from the lowest level to top level. In an example scenario, small_G1 has sold 81 units and large G1 has sold 9 units for a ZIP code for a dynamic time period such as for one day period and it is arrived by aggregating from the next level as displayed in the FIG. 4A.

The dynamic aggregation interval refers to an aggregation interval comprising one of a daily interval, a weekly interval, and a monthly interval. The period of information or aggregation level for sales performance and local factors may vary depending on the category considered for hyperlocalization and local factors such as weather conditions and the like. For example, weekly data may be considered for yogurt category whereas quarterly data may be considered for electronics items. Weather condition used to play a major role in customer preferences. In addition, frequency of changes in weather condition is also will have an impact in customer preferences. If weather fluctuations are higher, weather conditions need to be considered at shorter intervals such as daily basis to understand its effect on customer preferences. If weather fluctuations are lower, weather conditions need to be considered at lengthier intervals such as weekly, monthly and quarterly. Aggregation of sales data for each ZIP code is done at different periods such as daily (as illustrated in the FIG. 8A), weekly (as illustrated in the FIG. 8B), monthly, and quarterly. The local factors and the sales performance have same level of aggregation such as daily (as illustrated in the FIG. 8A and FIG. 8E), or weekly (as illustrated in the FIG. 8B and FIG. 8F), or monthly or quarterly. It enables to identify optimal aggregation level for sales performance and local factors resulting hyper-localization which is explained in later sections.

At step 310 of the method 300, an aggregated value is computed at the aggregated value 210. The aggregated value is computed for each local factor value for the local factor among the plurality of local factors using the local factor hierarchical template for the local factor from the local factor data for the dynamic aggregation interval for each level from the plurality of local factor levels.

In an embodiment, considering an example scenario, the market research company provides information about 'number of people (,000) with age band' which is illustrated at the lowest level of FIG. 5A. From the lowest level, computation for 'number of people (,000) with age band' is done towards top level. Young_2G has 315,000 people and old_G has 30,000 people for a ZIP code which is arrived by aggregating from the next level. The value for middle_2G is computed by adding the values of middle_G and upper middle age bands. Thus, each level of the hierarchical template is computed by aggregating the values of next level. The same logic is followed to compute values of hierarchical templates for other local factors namely 'number of people (,000) with income band at ZIP code level' (as illustrated in the FIG. 6A) and 'average temperature under different time interval' (as illustrated in the FIG. 7A). In the FIG. 7A, different time intervals were shown for understanding purpose and computed average temperature values for different time intervals were not shown and marked as dotted line.

At step 312 of the method 300, a first set of optimal attribute values is identified for each attribute, a first set of optimal local factor values is identified for each local factor and an ideal aggregation interval is identified within the dynamic aggregation intervals in the first set 212.

The first set of optimal attribute values and a corresponding optimal attribute level are recognized from a level among the plurality of levels of the attribute hierarchical template based on a canonical analysis technique.

The first set of local factor values and a corresponding optimal local factor level are recognized from a local factor level among the plurality of levels of the local factor hierarchical template based on the canonical analysis technique.

The canonical analysis technique is performed between:
(i) each of the plurality of levels of the attribute hierarchical template;
(ii) each of the plurality levels of the local factor hierarchical template.

The canonical analysis is performed in an iterative manner to enable generation of a set of dynamic attribute values for each of the attributes and a set of dynamic local factor values for each of the local factor and further utilizing the set of dynamic attribute values and the set of dynamic local factor values to enable identification of the optimal attribute level for each of the attribute and the optimal local factor values for each of the local factor.

Figure 8B:
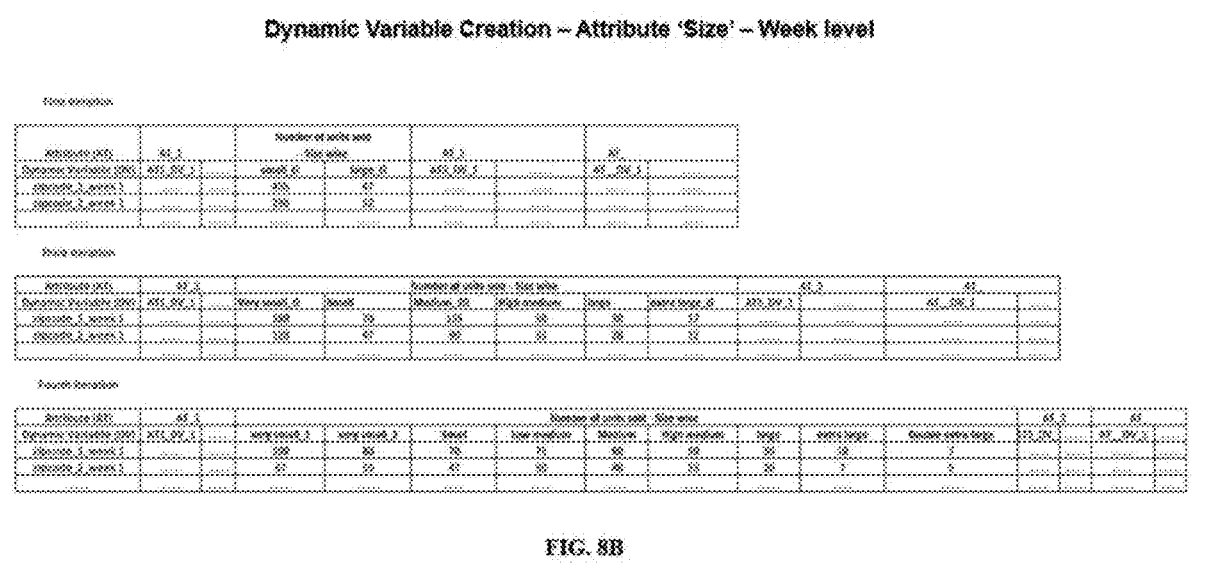

The process for generation of dynamic attribute values includes-during the iteration using the attribute template with computed sales, the number of columns for the attribute 'size' changes dynamically from two to nine when the iteration moves from first iteration to forth iteration and assuming that the iteration moves from top to bottom of hierarchical template and using the attribute values of level one to level four of hierarchical template as illustrated in the FIG. 8A and FIG. 8B. By similar way, the dynamic variables for other attributes are generated by using their respective hierarchical templates individually..

Figure 8C:
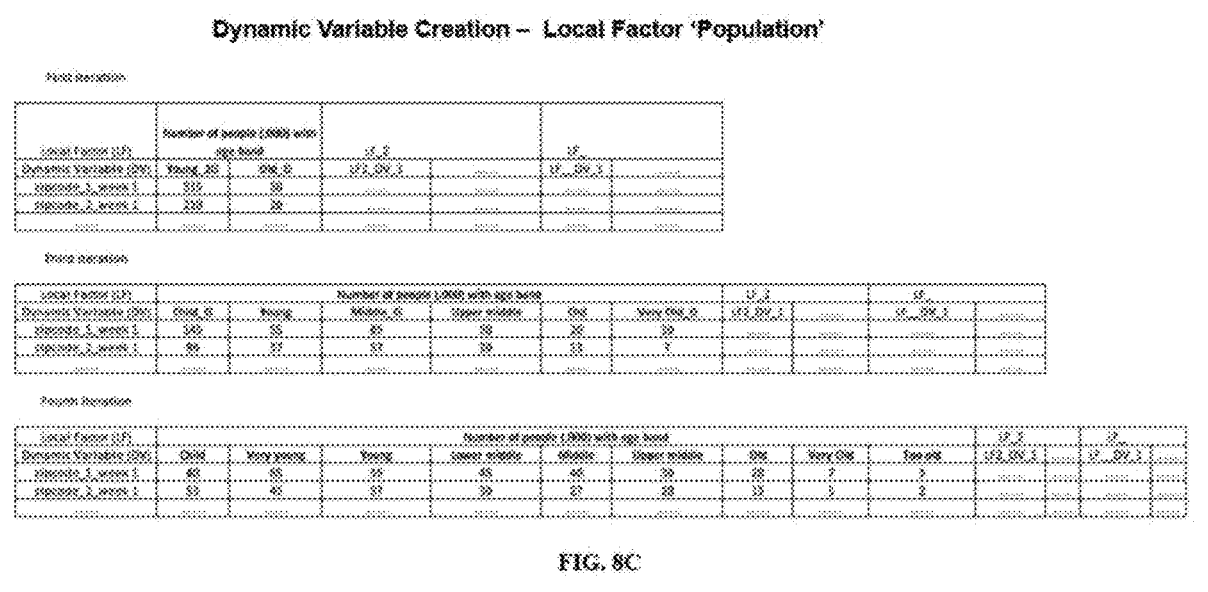
Figure 8D:
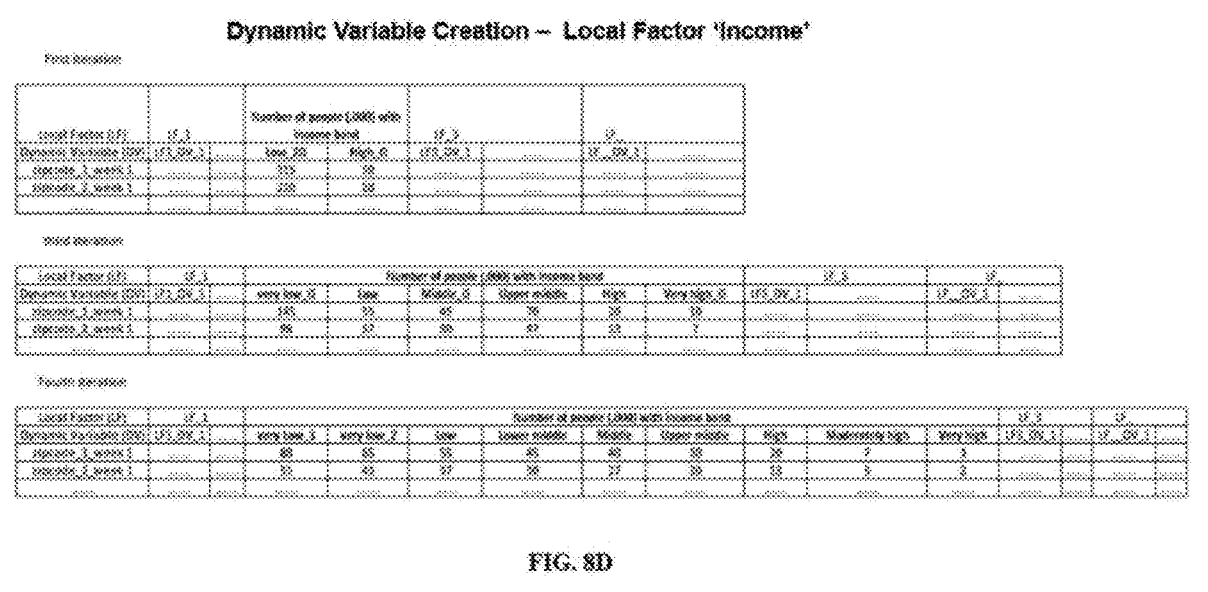

As illustrated in FIG. 8C, the process of generation of the dynamic local factor values during the iteration using the local factor hierarchical template with computed number of peoples with specific age band, the number of column for the local factor; changes dynamically from two to nine during first iteration to forth iteration. Here it is assumed that the iteration moves from top to bottom of local factor hierarchical template and the movement from level one to level four of hierarchical template results in changes in the number of columns As illustrated in FIG. 8D, during the iteration using the local factor hierarchical template with computed number of peoples with specific income band, the number of columns for the local factor; changes dynamically from two to nine during first iteration to forth iteration.

Figure 8E:
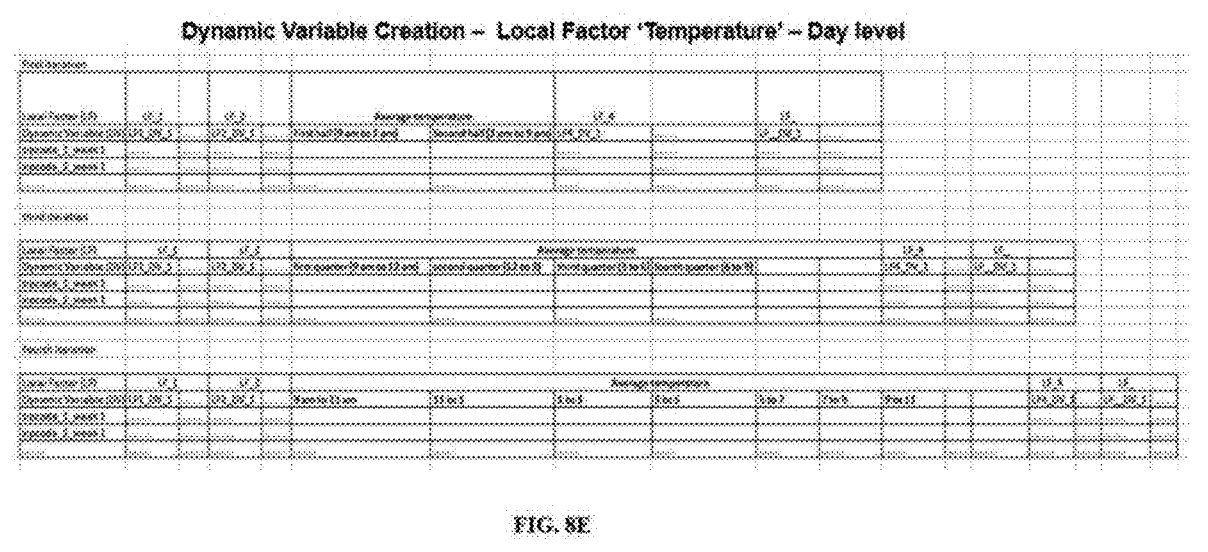
Figure 8F:
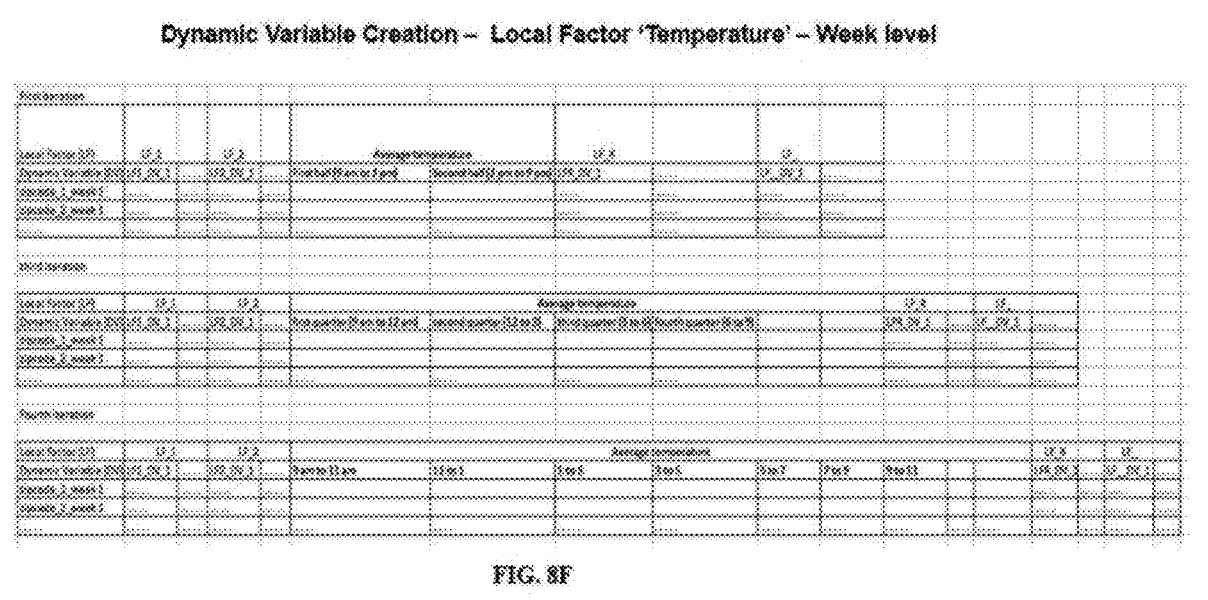

During the iteration using the local factor hierarchical template with computed average temperature, the number of columns for the local factor changes dynamically from two to seven when the iteration moves from top to bottom of local factor hierarchical template and from first iteration to forth iteration as illustrated in the FIG. 8E and the FIG. 8F. If weather fluctuations within a day are higher, weather conditions need to be considered at shorter intervals such as hourly basis to relate its effect on customer preferences. If weather fluctuations within a day are lower, weather conditions need to be considered at lengthier intervals such as 6 hours interval or 3 hours interval. The ideal time interval is decided by the system using different level of the hierarchical template thereby creating dynamic time intervals.

In an embodiment, the first set of optimal attribute values, a first set of optimal local factor values and the ideal aggregation interval is identified/estimated using several steps as illustrated in the flowchart (900) of FIG. 9.

At step 902 of the method 900, a wilks lambda is iteratively computed for each iteration by performing the canonical analysis technique. The canonical analysis technique is computed between:
(i) each of the plurality of levels of the attribute hierarchical template with the sales performance measure of each of the attribute values of the plurality of attributes for the dynamic aggregation interval and
(ii) each of the plurality levels of the local factor hierarchical template with the aggregated value of each local factor from the plurality of local factors for the dynamic aggregation interval.

In an embodiment, initially, the sales of attribute vales and the local factors are kept at level 1 for all the attributes as displayed in the FIG. 4A and canonical analysis (CA) is performed to obtain the hyper localization measure from wilks lambda value of CA, Wilks lambda criterion is the most widely used measure to validate the relationship between canonical variates. During canonical analysis, linear combination of dependent variables yields dependent canonical variates and linear combination of independent variables yield independent canonical variates. Wilks lambda is a measure of the percent variance in dependent canonical variates not explained by differences in levels of the independent canonical variates. A value of zero means that there isn't any variance not explained by the independent canonical variates (which is ideal). In other words, the closer to zero the statistic is, the more the variable in question contributes to the model. As canonical analysis is applied between the individual sales of each attribute in dynamic columnar format as dependent variables and the local factors in dynamic columnar format as independent variables in different levels using canonical analysis, wilks lambda criterion provided by canonical analysis is considered as a measure to indicate a level of hyper localization. The hyper localization refers to offering of attribute values specific to location of a store. The value of wilks lambda criterion has value range as 0 to 1 and has opposite relationship with hyper localization and thus the wilks lambda with value as 0 indicates maximum hyper localization and the value as 1 indicates minimum hyper localization. During canonical analysis, linear combination of dependent variables yields dependent canonical variates and linear combination of independent variables yield independent canonical variates. Independent canonical variates also referred commonly as independent canonical vectors are used for clustering of ZIP codes which is explained in later section. Dependent canonical variates also referred commonly as dependent canonical vectors may be used for identifying ZIP codes with top sales performance based on attribute values of the category.

At step 904 of the method 900, an optimal attribute level is identified in the attribute hierarchical template with an ideal aggregation interval and an optimal local factor level in the local factor hierarchical template with the ideal aggregation interval based on the wilks lambda among the wilks lambda values computed, wherein the ideal aggregation interval is identified within the dynamic aggregation intervals based on the wilks lambda values.

In any level of attribute hierarchical template may form hyper localization with any level of local factor hierarchical template. In other words, the levels of attribute hierarchical template and local factor template to attain hyper localization need not necessarily be at the same level. However, it is ensured that all the attributes have same level of their respective hierarchical template during each iteration of running canonical analysis. It enables to identify the optimal first set of attribute values in shorter span of time by using lesser memory resources. The reason is that all the attributes of a category are assumed that they have similar merits and demerits based on top level and bottom level and as per retail behavior, it is expected that the intermediate level more particularly the level at middle of hierarchical templates of attributes and the level at middle of hierarchical templates of local factors may provide hyper localization. It is enabled by performing canonical analysis technique between each of the plurality of levels of the attribute hierarchical template and each of the plurality levels of the local factor hierarchical template and identifying the levels for attribute hierarchical template and local factor hierarchical template with maximum hyper localization from wilks lambda value. In an instance, as illustrated in the FIG. 4A—level 3 of attribute hierarchical template and, as illustrated in the FIG. 6A—level 2 of local factor template form hyper localization, which shows that the attribute and the local factor may have different levels that result hyper-localization.

At step 906 of the method 900, recognizing the first set of optimal attribute values for each plurality of attribute from the identified optimal attribute level of the attribute hierarchical template and recognizing the first set of local factor values for each local factor from the identified optimal local factor level of the local factor hierarchical template.

As illustrated in the FIG. 4A, the first set of recognized optimal attribute values for the attribute 'size' are very small_G, small, medium_2G, high medium, large, and extra-large_G and they are recognized from the level 3 of attribute hierarchical template which is identified from canonical analysis. As illustrated in the FIG. 5A, the first set of recognized optimal local factor value for 'Number of people (000) with age band' are young_G, middle_2G and old_G and they are recognized from the level 2 of template with 'number of people (000) with age band'. As illustrated in the FIG. 6A, the first set of recognized optimal local factor for the local factor 'income' are low_G, middle_2G and high_G and they are recognized from the level 2 of template for income band. As illustrated in the FIG. 7A, the first set of recognized optimal local factor value for 'average temperature for different time interval' are 4 hours interval such as 9 to 1, 1 to 5 and 5 to 9 and they are recognized from the level 2 of local factor template for average temperature. Here, level two was identified for all the local factors due to the reason is that same level of hierarchical template is selected for all local factors for each iteration to enable minimal computer memory usage and efficiency improvement.

At step 312 of the method 300, a second set of optimal attribute values and a second set of optimal local factor values is identified in the second set 214. The second set of optimal attribute values and a second set of optimal local factor values is identified by performing the canonical analysis technique on the identified optimal attribute level in the attribute hierarchical template and the identified optimal local factor level in the local factor hierarchical template.

In an embodiment, the process of identification of the second set of optimal attribute values for each attribute is performed using several steps as illustrated in the flowchart (1000) of FIG. 10.

At step 1002 of the method 1000, the canonical analysis technique is iteratively performed on the identified optimal attribute level to obtain a wilks lambda for each iteration. The canonical analysis technique is performed for each iteration based on the attribute values of the attribute corresponding to the identified optimal attribute level of the attribute hierarchical template by changing one attribute values at a time for the iteration while keeping the other attribute values at the identified optimal attribute level and retaining the local factor values of the local factor at the identified optimal local factor level. Keeping the already identified optimal attribute level and optimal local factor level as the base and searching for the second set enables to identify the optimal second set of attribute values in shorter span of time by using lesser memory resources. The reason is that it is expected that the optimal values of attribute and local factor for the second set will be nearer to those already identified levels of hierarchical template of attribute and hierarchical template of local factor.

In an embodiment, the canonical analysis technique is performed to capture unique behavior of few attribute values. In an instance some attributes may behave differently, and their level of hyper localization may vary with first set of attribute values At step 1004 of the method 1000, the second set of optimal attribute values is identified using the attribute values of the attribute in the identified optimal attribute level resulting in an improvement in wilks lambda obtained for each iteration.

In an embodiment, considering the FIG. 4B, the attribute value 'medium_G' produces improvement in wilks lambda value, thus resulting in improved hyper localization. In an embodiment, the process of identification of the second set of optimal local factor for each local factor is performed using several steps as illustrated in the flowchart (1100) of FIG. 11.

At step 1102 of the method 1100, the canonical analysis technique is iteratively performed on the identified optimal local factor level to obtain a wilks lambda for each iteration.

The canonical analysis technique is performed for each iteration based on the local factor values of the local factor corresponding to the identified optimal local factor level of the local factor hierarchical template by changing one local factor value at a time for the iteration while keeping the other local factor values at the identified optimal local factor level and retaining the attribute values of the attributes at the identified optimal attribute level.

At step 1104 of the method 1100, the second set of optimal local factor values is identified using the local factor values of the local factors in the identified optimal local factor level resulting in an improvement in wilks lambda obtained for each iteration.

As illustrated in FIG. 5B, the second set of recognized optimal local factor value for 'number of people (,000) with age band' are child_G and young marked with 'dotted box' and they are recognized from the level 3 of template with 'number of people (,000) with age band'. As illustrated in FIG. 6B, the second set of local factor values for income band are 'high' and 'very high_G' marked with 'dotted box', as they produces improvement in wilks lambda value. The second set of recognized optimal local factor value for 'average temperature under different time intervals' are 3 hours interval such as 3 to 6 and 6 to 9 marked with 'dotted box' (as illustrated in the FIG. 7B) and they are recognized from the level 3 of hierarchical template for average temperature.

The identification of a level for attribute and a level for local factor having optimal hyper-localization followed by identification of unique attribute values or unique local factor values enable to arrive the required outputs in shorter span of time by minimizing usage of computer memory. The reason is described in the following sections—The number of distinct attribute values associated with top level is lesser as compared to bottom level, thus they can be accommodated with the space available with retailers easily. However, they may not address customer preferences as customer may prefer more granular attribute values. In contrast, the number of attribute values associated with bottom level is more as compared to top level, thus the customer preferences are addressed by the attribute values existing in the bottom level. However, retailers may face challenges in keeping those greater number of attribute values due to limited space. It is assumed that all attributes have similar merits and demerits of top level and bottom level of respective attribute template. Due to the assumption made, all attributes are kept at the same level during each iteration, and it minimizes the number of permutation and combination to identify optimal attribute values and the same logic is applicable to local factor also. The unique behavior of certain attribute values is captured from the second set of attribute values. Three points need to be noted. Firstly, the identified optimal level for attribute is a single level and it corresponds to all the attributes and identified unique attribute values is specific to respective attribute. Secondly, the identified optimal level for local factor is a single level and it corresponds to all local factors and identified unique local factor values is specific to respective local factor. Thirdly, the identified single optimal level for attribute and identified single optimal level for local factor are not necessarily the same and both may be same or different depending on the outcome of the canonical analysis technique.

At step 314 of the method 300, a hyper localized assortment of a category is performed in the hyper localized assortment 216.

The hyper localized assortment of a category refers to offering of attribute values of the category based on the location of a store, wherein the ZIP code indicates the location of store.

The hyper localized assortment of a category is performed based on the identified first set of optimal attribute values of each attribute and the second set of optimal attribute values of each attribute. Once maximum hyper-localization is achieved, the different levels attained by different attribute values are the source to decide varieties that retailer need to consider for hyper localization.

Once maximum hyper-localization is achieved, the number of distinct attribute values of each attribute which may occur in same level (during first set identification) or across levels (during second set identification) indicates the number of variety for the attribute that retailer need to consider for hyper localization due to the reason is that those identified optimal attribute values have maximum influence with those identified optimal local factors.

In an instance, for the yogurt category, FIGS. 4A and 4B display the ideal sizes that need to be kept in the store to address hyper localization. Those attribute values marked with 'dotted box' in the figures are the level of size in which system reaches maximum hyper localization. As per existing process, there were 9 distinct sizes were offered for yogurt category. The system suggests to consider 5 distinct sizes for assortment strategies. The 50 ml and 100 ml is clubbed and any one among them is suggested to retain by the system. 250 ml was identified in the first set of attribute values and needs to be retained. Among 500 ml, 750 ml and 1 L, any one among them is suggested by the system due to the reason is that medium_G was identified during second set of attributes. 2 L was identified in the first set of attribute values and it needs to be retained. Similarly, among 3 L and 5 L, any one among them is suggested and retained. The other sizes are omitted for assortment strategies.

Clustering of the geographical ZIP codes, is done based on independent canonical variates derived during the canonical analysis technique using the identified first set of optimal local factor values of each local factor and the second set of optimal local factor values of each local factor. In retail, clustering of ZIP codes is done for effective implementation of retail strategies. Based on the retail strategy, the information collected for clustering will vary and success of clustering depends on the information used for clustering and method of processing the information. For example, information used for clustering for promotion strategy will vary as compared to information used for clustering for assortment. The source of information received from market research companies for clustering may have different formats which needs to be processed for effective cluster formation. The disclosure explains the method for identifying optimal local factor values that are influencing optimal attribute values and identifying linear combination of local factor values in the form of independent canonical variates. The independent canonical variates are used for clustering of ZIP codes and the clusters of ZIP codes identified are used for hyper localized assortment. It is to be noted the independent canonical variates are generated as a derived variables during canonical analysis technique.

Referring to FIGS. 5A and 5B, as per the data provided by market research companies, there were ten age bands and system suggests to have 4 age bands namely child_G, young, middle_2G and old_G. As per the data provided by market research companies, there were 9 distinct income groups given for each ZIP code. System suggests to keep 4 distinct income groups which are marked as dotted boxes in FIGS. 6A and 6B namely low_G, middle_2G, high, very high_G. As per the data provided by weather stations, there were 12 hourly time intervals and system suggests to have three time intervals such as 9 am to 1 pm, 3 pm to 6 pm and 6 pm to 9 pm which are marked as dotted boxes in FIGS. 7A and 7B. Clustering of ZIP codes is performed from independent canonical variates derived during canonical analysis using the identified optimal local factor values namely income groups, time intervals for temperature, age bands along with identified values for other local factors.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

This disclosure relates generally to assortment of products in a retail scenario and more particularly to variety optimization in hyper-localized assortment. In retail scenario, due to availability of limited space in the store, retailers have limited options for displaying a category based on the attribute values of important attributes of the category. In addition, due to increased customer expectations, the attribute values are increasing each day leading to challenges in variety optimization in assortment. The state-of-art techniques address the problem of identification of key attributes for a category, however identifying optimal attribute values among the numerous attribute values specific to location of stores is still challenging. The disclosure provides methods to enable variety optimization in hyper localized assortment by identifying optimal attribute values for each attribute which are influenced mostly by location of stores by creating and applying dynamic variables in canonical analysis using hierarchical templates in an iterative way.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving a plurality of inputs associated to one or more products of a category for a plurality of geographical ZIP codes, via one or more hardware processors, wherein the plurality of inputs comprises a historical purchase data of the one or more products at a ZIP code level for a dynamic aggregation interval, wherein each one or more products is associated with a product identifier, a plurality of attributes, a plurality of attribute values associated with each attribute from the plurality of attributes, a quantity, a plurality of local factors, a plurality of local factor values associated with each local factor from the plurality of local factors and a product master data;

creating an attribute hierarchical template for each of the plurality of attributes using the product master data for a category, via the one or more hardware processors, wherein the attribute hierarchical template for each of the plurality of attribute comprises a plurality of attribute levels including a bottom attribute level, a top attribute level and a plurality of middle attribute levels;

creating a local factor hierarchical template for each local factor from plurality of local factors, via the one or more hardware processors, wherein the local factor hierarchical template for each local factor comprises a plurality of levels including a bottom local factor level, a top local factor level and a plurality of middle local factor levels;

computing a sales performance measure for each attribute value of each attribute among the plurality of attributes for the dynamic aggregation interval from the historical purchase data for each level from the plurality of attribute levels based on the attribute hierarchical template, via the one or more hardware processors, wherein the dynamic aggregation interval refers to an aggregation interval comprising one of a daily interval, a weekly interval and a monthly interval;

computing an aggregated value for each of the plurality of local factor value for the local factor among the plurality of local factors via the one or more hardware processors, using the local factor hierarchical template for the local factor from the local factor data for the dynamic aggregation interval for each level from the plurality of local factor levels;

identifying a first set of optimal attribute values for each attribute, a first set of optimal local factor values for each local factor, an ideal aggregation interval within the dynamic aggregation intervals, via the one or more hardware processors, wherein:

(a) the first set of optimal attribute values and a corresponding optimal attribute level are recognized from a level among the plurality of levels of the attribute hierarchical template based on a canonical analysis technique, wherein the first set of optimal attribute values are identified with minimal usage of computer memory as all attributes are kept at a same level during each iteration, and thereby minimizes number of permutation and combination in identifying the first set of optimal attribute values, wherein the canonical analysis technique is performed between (i) each of the plurality of levels of the attribute hierarchical template and (ii) each of the plurality levels of the local factor hierarchical template in an iterative manner to enable generation of a set of dynamic attribute values for each of the attributes and a set of dynamic local factor values for each of the local factor and further utilizing the set of dynamic attribute values and the set of dynamic local factor values to enable identification of the optimal attribute level for each of the attribute and the optimal local factor values for each of the local factor, wherein generation of dynamic attribute values includes:

dynamically changing number of columns for size attribute, from a first value to a second value using the attribute hierarchical template with computed sales when an iteration moves from a first iteration to a fourth iteration;

dynamically changing the number of columns for age attribute, from a third value to a fourth value using the local factor hierarchical template when the iteration moves from the first iteration to the fourth iteration;

dynamically changing the number of columns for a computed average temperature, from a fifth value to a sixth value using the local factor hierarchical template when the iteration moves from the first iteration to the fourth iteration; and (b) the first set of local factor values and a corresponding optimal local factor level are recognized from a local factor level among the plurality of levels of the local factor hierarchical template based on the canonical analysis technique;

identifying a second set of optimal attribute values and a second set of optimal local factor values, via the one or more hardware processors, by performing the canonical analysis technique on the identified optimal attribute level in the attribute hierarchical template and the identified optimal local factor level in the local factor hierarchical template; and performing a hyper localized assortment of a category based on the identified first set of optimal attribute values of each attribute and the second set of optimal attribute values of each attribute and performing clustering of the geographical ZIP codes, via the one or more hardware processors, based on independent canonical variates derived during the canonical analysis technique using the identified first set of optimal local factor values of each local factor and the second set of optimal local factor values of each local factor.

2. The processor implemented method of claim 1, wherein the hyper localized assortment of a category refers to offering of attribute values of the category based on the location of a store, wherein the ZIP code indicates the location of store.

3. The processor implemented method of claim 1, wherein the plurality of local factor data comprises a demographic data capturing information about each ZIP code covering a trade area for a dynamic aggregation interval including a household information, an income, an ethnic group and an age group, a weather data captured at the dynamic aggregation interval, the product master data comprises a product identifier, an attribute value for each attribute for each of the one or more products, wherein the attribute hierarchical template comprises a plurality of attribute levels in which the bottom attribute level comprises a lowest level of attribute values, the top attribute level comprises a highest level of the attribute values and the plurality of middle attribute level comprises a intermediate levels of the attribute values, and wherein the local factor hierarchical template comprises a plurality of levels in which the bottom local factor level comprises a lowest level of local factor value, the top local factor level comprises a highest level of the local factor value and the plurality of middle local factor level comprises an intermediate local factor level of the local factor values.

4. The processor implemented method of claim 1, wherein identifying the first set of optimal attribute values and the first set of optimal local factor values comprises:

iteratively computing a wilks lambda for each iteration by performing the canonical analysis technique between (i) each of the plurality of levels of the attribute hierarchical template with the sales performance measure of each of the attribute values of the plurality of attributes for the dynamic aggregation interval and (ii) each of the plurality levels of the local factor hierarchical template with the aggregated value of each local factor from the plurality of local factors for the dynamic aggregation interval;

identifying an optimal attribute level in the attribute hierarchical template with an ideal aggregation interval and an optimal local factor level in the local factor hierarchical template with the ideal aggregation interval based on the wilks lambda among the wilks lambda values computed, wherein the ideal aggregation interval is identified within the dynamic aggregation intervals based on the wilks lambda values; and recognizing the first set of optimal attribute values for each plurality of attribute from the identified optimal attribute level of the attribute hierarchical template and recognizing the first set of local factor values for each local factor from the identified optimal local factor level of the local factor hierarchical template.

5. The processor implemented method of claim 1, wherein identifying the second set of optimal attribute values for each attribute comprises:

iteratively performing the canonical analysis technique on the identified optimal attribute level to obtain a wilks lambda for each iteration, wherein the canonical analysis technique is performed for each iteration based on the attribute values of the attribute corresponding to the identified optimal attribute level of the attribute hierarchical template by changing one attribute values at a time for the iteration while keeping the other attribute values at the identified optimal attribute level and retaining the local factor values of the local factor at the identified optimal local factor level; and identifying the second set of optimal attribute values using the attribute values of the attribute in the identified optimal attribute level resulting in an improvement in wilks lambda obtained for each iteration.

6. The processor implemented method of claim 1, wherein the second set of optimal local factor for each local factor comprises:

iteratively performing the canonical analysis technique on the identified optimal local factor level to obtain a wilks lambda for each iteration, wherein the canonical analysis technique is performed for each iteration based on the local factor values of the local factor corresponding to the identified optimal local factor level of the local factor hierarchical template by changing one local factor value at a time for the iteration while keeping the other local factor values at the identified optimal local factor level and retaining the attribute values of the attributes at the identified optimal attribute level; and identifying the second set of optimal local factor values using the local factor values of the local factors in the identified optimal local factor level resulting in an improvement in wilks lambda obtained for each iteration.

7. A system, comprising:

a memory storing instructions;

one or more communication interfaces; and one or more hardware processors coupled to the memory via the one or more communication interfaces, wherein the one or more hardware processors are configured by the instructions to:

receive a plurality of inputs associated to one or more products of a category for a plurality of geographical ZIP codes, wherein the plurality of inputs comprises a historical purchase data of the one or more products at a ZIP code level for a dynamic aggregation interval, wherein each one or more products is associated with a product identifier, a plurality of attributes, a plurality of attribute values associated with each attribute from the plurality of attributes, a quantity, a plurality of local factors, a plurality of local factor values associated with each local factor from the plurality of local factors and a product master data;

create an attribute hierarchical template for each of the plurality of attribute using the product master data for a category, wherein the attribute hierarchical template for each attribute comprises a plurality of attribute levels including a bottom attribute level, a top attribute level and a plurality of middle attribute levels;

create a local factor hierarchical template for each local factor from plurality of local factors, wherein the local factor hierarchical template for each local factor comprises a plurality of levels including a bottom local factor level, a top local factor level and a plurality of middle local factor levels;

compute a sales performance measure for each attribute value of each attribute among the plurality of attributes for the dynamic aggregation interval from the historical purchase data for each level from the plurality of attribute levels based on the attribute hierarchical template, wherein the dynamic aggregation interval refers to an aggregation interval comprising one of a daily interval, a weekly interval and a monthly interval;

compute an aggregated value for each of the plurality of local factor value for the local factor among the plurality of local factors using the local factor hierarchical template for the local factor from the local factor data for the dynamic aggregation interval for each level from the plurality of local factor levels;

identify a first set of optimal attribute values for each attribute, a first set of optimal local factor values for each local factor, an ideal aggregation interval within the dynamic aggregation intervals, wherein:

(a) the first set of optimal attribute values and a corresponding optimal attribute level are recognized from a level among the plurality of levels of the attribute hierarchical template based on a canonical analysis technique, wherein the first set of optimal attribute values are identified with minimal usage of computer memory as all attributes are kept at a same level during each iteration, and thereby minimizes number of permutation and combination in identifying the first set of optimal attribute values, wherein the canonical analysis technique is performed between (i) each of the plurality of levels of the attribute hierarchical template and (ii) each of the plurality levels of the local factor hierarchical template in an iterative manner to enable generation of a set of dynamic attribute values for each of the attributes and a set of dynamic local factor values for each of the local factor and further utilizing the set of dynamic attribute values and the set of dynamic local factor values to enable identification of the optimal attribute level for each of the attribute and the optimal local factor values for each of the local factor, wherein generation of dynamic attribute values includes:

dynamically changing number of columns for size attribute, from a first value to a second value using the attribute hierarchical template with computed sales when an iteration moves from a first iteration to a fourth iteration;

dynamically changing the number of columns for age attribute, from a third value to a fourth value using the local factor hierarchical template when the iteration moves from the first iteration to the fourth iteration;

dynamically changing the number of columns for a computed average temperature, from a fifth value to a sixth value using the local factor hierarchical template when the iteration moves from the first iteration to the fourth iteration; and (b) the first set of local factor values and a corresponding optimal local factor level are recognized from a local factor level among the plurality of levels of the local factor hierarchical template based on the canonical analysis technique;

identify a second set of optimal attribute values and a second set of optimal local factor values by performing the canonical analysis technique on the identified optimal attribute level in the attribute hierarchical template and the identified optimal local factor level in the local factor hierarchical template; and perform a hyper localized assortment of a category based on the identified first set of optimal attribute values of each attribute and the second set of optimal attribute values of each attribute and performing clustering of the geographical ZIP codes based on independent canonical variates derived during the canonical analysis technique using the identified first set of optimal local factor values of each local factor and the second set of optimal local factor values of each local factor.

8. The system of claim 7, wherein the plurality of local factor data comprises a demographic data capturing information about each ZIP code covering a trade area for a dynamic aggregation interval including a household information, an income, an ethnic group and an age group, a weather data captured at the dynamic aggregation interval, the product master data comprises a product identifier, an attribute value for each attribute for each of the one or more products.

9. The system of claim 7, wherein the attribute hierarchical template comprises a plurality of attribute levels in which the bottom attribute level comprises a lowest level of attribute values, the top attribute level comprises a highest level of the attribute values and the plurality of middle attribute level comprises a intermediate levels of the attribute values, and wherein the local factor hierarchical template comprises a plurality of levels in which the bottom local factor level comprises a lowest level of local factor value, the top local factor level comprises a highest level of the local factor value and the plurality of middle local factor level comprises an intermediate local factor level of the local factor values, and wherein identifying the first set of optimal attribute values and the first set of optimal local factor values comprises:

iteratively computing a wilks lambda for each iteration by performing the canonical analysis technique between (i) each of the plurality of levels of the attribute hierarchical template with the sales performance measure of each of the attribute values of the plurality of attributes for the dynamic aggregation interval and (ii) each of the plurality levels of the local factor hierarchical template with the aggregated value of each local factor from the plurality of local factors for the dynamic aggregation interval;

identifying an optimal attribute level in the attribute hierarchical template with an ideal aggregation interval and an optimal local factor level in the local factor hierarchical template with the ideal aggregation interval based on the wilks lambda among the wilks lambda values computed, wherein the ideal aggregation interval is identified within the dynamic aggregation intervals based on the wilks lambda values; and recognizing the first set of optimal attribute values for each plurality of attribute from the identified optimal attribute level of the attribute hierarchical template and recognizing the first set of local factor values for each local factor from the identified optimal local factor level of the local factor hierarchical template.

10. The system of claim 7, wherein identifying the second set of optimal attribute values for each attribute comprises:

iteratively performing the canonical analysis technique on the identified optimal attribute level to obtain a wilks lambda for each iteration, wherein the canonical analysis technique is performed for each iteration based on the attribute values of the attribute corresponding to the identified optimal attribute level of the attribute hierarchical template by changing one attribute values at a time for the iteration while keeping the other attribute values at the identified optimal attribute level and retaining the local factor values of the local factor at the identified optimal local factor level; and identifying the second set of optimal attribute values using the attribute values of the attribute in the identified optimal attribute level resulting in an improvement in wilks lambda obtained for each iteration.

11. The system of claim 7, wherein the second set of optimal local factor for each local factor comprises:

iteratively performing the canonical analysis technique on the identified optimal local factor level to obtain a wilks lambda for each iteration, wherein the canonical analysis technique is performed for each iteration based on the local factor values of the local factor corresponding to the identified optimal local factor level of the local factor hierarchical template by changing one local factor value at a time for the iteration while keeping the other local factor values at the identified optimal local factor level and retaining the attribute values of the attributes at the identified optimal attribute level; and identifying the second set of optimal local factor values using the local factor values of the local factors in the identified optimal local factor level resulting in an improvement in wilks lambda obtained for each iteration.

12. One or more non-transitory machine-readable information storage mediums comprising one or more instructions which when executed by one or more hardware processors cause:

receiving a plurality of inputs associated to one or more products of a category for a plurality of geographical ZIP codes, wherein the plurality of inputs comprises a historical purchase data of the one or more products at a ZIP code level for a dynamic aggregation interval, wherein each one or more products is associated with a product identifier, a plurality of attributes, a plurality of attribute values associated with each attribute from the plurality of attributes, a quantity, a plurality of local factors, a plurality of local factor values associated with each local factor from the plurality of local factors and a product master data;

creating an attribute hierarchical template for each of the plurality of attributes using the product master data for a category, wherein the attribute hierarchical template for each of the plurality of attribute comprises a plurality of attribute levels including a bottom attribute level, a top attribute level and a plurality of middle attribute levels;

creating a local factor hierarchical template for each local factor from plurality of local factors, wherein the local factor hierarchical template for each local factor comprises a plurality of levels including a bottom local factor level, a top local factor level and a plurality of middle local factor levels;

computing a sales performance measure for each attribute value of each attribute among the plurality of attributes for the dynamic aggregation interval from the historical purchase data for each level from the plurality of attribute levels based on the attribute hierarchical template, wherein the dynamic aggregation interval refers to an aggregation interval comprising one of a daily interval, a weekly interval and a monthly interval;

computing an aggregated value for each of the plurality of local factor value for the local factor among the plurality of local factors, using the local factor hierarchical template for the local factor from the local factor data for the dynamic aggregation interval for each level from the plurality of local factor levels;

identifying a first set of optimal attribute values for each attribute, a first set of optimal local factor values for each local factor, an ideal aggregation interval within the dynamic aggregation intervals, wherein:

(a) the first set of optimal attribute values and a corresponding optimal attribute level are recognized from a level among the plurality of levels of the attribute hierarchical template based on a canonical analysis technique, wherein the first set of optimal attribute values are identified with minimal usage of computer memory as all attributes are kept at a same level during each iteration, and thereby minimizes number of permutation and combination in identifying the first set of optimal attribute values, wherein the canonical analysis technique is performed between (i) each of the plurality of levels of the attribute hierarchical template and (ii) each of the plurality levels of the local factor hierarchical template in an iterative manner to enable generation of a set of dynamic attribute values for each of the attributes and a set of dynamic local factor values for each of the local factor and further utilizing the set of dynamic attribute values and the set of dynamic local factor values to enable identification of the optimal attribute level for each of the attribute and the optimal local factor values for each of the local factor, wherein generation of dynamic attribute values includes:

dynamically changing number of columns for size attribute, from a first value to a second value using the attribute hierarchical template with computed sales when an iteration moves from a first iteration to a fourth iteration;

dynamically changing the number of columns for age attribute, from a third value to a fourth value using the local factor hierarchical template when the iteration moves from the first iteration to the fourth iteration;

dynamically changing the number of columns for a computed average temperature, from a fifth value to a sixth value using the local factor hierarchical template when the iteration moves from the first iteration to the fourth iteration; and (b) the first set of local factor values and a corresponding optimal local factor level are recognized from a local factor level among the plurality of levels of the local factor hierarchical template based on the canonical analysis technique;

identifying a second set of optimal attribute values and a second set of optimal local factor values, by performing the canonical analysis technique on the identified optimal attribute level in the attribute hierarchical template and the identified optimal local factor level in the local factor hierarchical template; and performing a hyper localized assortment of a category based on the identified first set of optimal attribute values of each attribute and the second set of optimal attribute values of each attribute and performing clustering of the geographical ZIP codes, via the one or more hardware processors, based on independent canonical variates derived during the canonical analysis technique using the identified first set of optimal local factor values of each local factor and the second set of optimal local factor values of each local factor.

13. The one or more non-transitory machine-readable information storage mediums of claim 12, wherein the hyper localized assortment of a category refers to offering of attribute values of the category based on the location of a store, wherein the ZIP code indicates the location of store.

14. The one or more non-transitory machine-readable information storage mediums of claim 12, wherein the plurality of local factor data comprises a demographic data capturing information about each ZIP code covering a trade area for a dynamic aggregation interval including a household information, an income, an ethnic group and an age group, a weather data captured at the dynamic aggregation interval, the product master data comprises a product identifier, an attribute value for each attribute for each of the one or more products, wherein the attribute hierarchical template comprises a plurality of attribute levels in which the bottom attribute level comprises a lowest level of attribute values, the top attribute level comprises a highest level of the attribute values and the plurality of middle attribute level comprises a intermediate levels of the attribute values, and wherein the local factor hierarchical template comprises a plurality of levels in which the bottom local factor level comprises a lowest level of local factor value, the top local factor level comprises a highest level of the local factor value and the plurality of middle local factor level comprises an intermediate local factor level of the local factor values.

15. The one or more non-transitory machine-readable information storage mediums of claim 12, wherein identifying the first set of optimal attribute values and the first set of optimal local factor values comprises:

iteratively computing a wilks lambda for each iteration by performing the canonical analysis technique between (i) each of the plurality of levels of the attribute hierarchical template with the sales performance measure of each of the attribute values of the plurality of attributes for the dynamic aggregation interval and (ii) each of the plurality levels of the local factor hierarchical template with the aggregated value of each local factor from the plurality of local factors for the dynamic aggregation interval;

identifying an optimal attribute level in the attribute hierarchical template with an ideal aggregation interval and an optimal local factor level in the local factor hierarchical template with the ideal aggregation interval based on the wilks lambda among the wilks lambda values computed, wherein the ideal aggregation interval is identified within the dynamic aggregation intervals based on the wilks lambda values; and recognizing the first set of optimal attribute values for each plurality of attribute from the identified optimal attribute level of the attribute hierarchical template and recognizing the first set of local factor values for each local factor from the identified optimal local factor level of the local factor hierarchical template.

16. The one or more non-transitory machine-readable information storage mediums of claim 12, wherein identifying the second set of optimal attribute values for each attribute comprises:

iteratively performing the canonical analysis technique on the identified optimal attribute level to obtain a wilks lambda for each iteration, wherein the canonical analysis technique is performed for each iteration based on the attribute values of the attribute corresponding to the identified optimal attribute level of the attribute hierarchical template by changing one attribute values at a time for the iteration while keeping the other attribute values at the identified optimal attribute level and retaining the local factor values of the local factor at the identified optimal local factor level; and identifying the second set of optimal attribute values using the attribute values of the attribute in the identified optimal attribute level resulting in an improvement in wilks lambda obtained for each iteration.

17. The one or more non-transitory machine-readable information storage mediums of claim 12, wherein the second set of optimal local factor for each local factor comprises:

iteratively performing the canonical analysis technique on the identified optimal local factor level to obtain a wilks lambda for each iteration, wherein the canonical analysis technique is performed for each iteration based on the local factor values of the local factor corresponding to the identified optimal local factor level of the local factor hierarchical template by changing one local factor value at a time for the iteration while keeping the other local factor values at the identified optimal local factor level and retaining the attribute values of the attributes at the identified optimal attribute level; and identifying the second set of optimal local factor values using the local factor values of the local factors in the identified optimal local factor level resulting in an improvement in wilks lambda obtained for each iteration.

* * * * *